United States Patent
Gupta et al.

(10) Patent No.: US 12,082,199 B2
(45) Date of Patent: Sep. 3, 2024

(54) GROUP COMMON CONTROL CHANNEL IN ULTRA-RELIABLE/LOW-LATENCY COMMUNICATIONS

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/242,806

(22) Filed: Jan. 8, 2019

(65) Prior Publication Data

US 2019/0223206 A1    Jul. 18, 2019

Related U.S. Application Data

(60) Provisional application No. 62/617,441, filed on Jan. 15, 2018.

(51) Int. Cl.
*H04W 72/23*    (2023.01)
*H04L 1/00*    (2006.01)
(Continued)

(52) U.S. Cl.
CPC .......... *H04W 72/23* (2023.01); *H04L 1/0003* (2013.01); *H04L 1/1893* (2013.01);
(Continued)

(58) Field of Classification Search
CPC ... H04L 1/0003; H04L 1/0009; H04L 1/1893; H04L 1/1896; H04L 2001/0093;
(Continued)

(56) References Cited

U.S. PATENT DOCUMENTS 8,891,462 B2    11/2014   Luo et al.
10,849,125 B2    11/2020   Damnjanovic et al.
(Continued)

FOREIGN PATENT DOCUMENTS

WO    WO-2011143586 A1    11/2011
WO    WO-2016123473 A1    8/2016

OTHER PUBLICATIONS

Nokia et al., "Enhanced Semi-Persistent Scheduling for 5G URLLC", 3GPP Draft; R1-1612251, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 5, 2016, XP051190365, Retrieved from the Internet: URL:http://www.3gpp.org/ftp/tsg_ran/WG1_RL1/TSGR1_87/Docs/ [retrieved on Nov. 5, 2016], 8 pages.

(Continued)

*Primary Examiner* — Nizam U Ahmed
(74) *Attorney, Agent, or Firm* — Holland & Hart LLP

(57) ABSTRACT

Methods, systems, and devices for wireless communications are described. A base station may transmit semi-persistent scheduling (SPS) messages to a set of user equipments (UEs) using respective resources corresponding to each UE. The base station may receive, from each of a subset of UEs from the set of UEs, a negative acknowledgement (NACK) message associated with the SPS messages. The base station may transmit a group downlink control message including information associated with a downlink resource configuration for retransmission of the respective SPS messages to the subset of UEs. The base station may retransmit SPS messages to each of the subset of UEs using the downlink resource configuration.

30 Claims, 18 Drawing Sheets

(51) Int. Cl.
*H04L 1/1867* (2023.01)
*H04L 5/00* (2006.01)

(52) U.S. Cl.
CPC .......... *H04L 1/1896* (2013.01); *H04L 5/0055* (2013.01); *H04L 5/0094* (2013.01); *H04L 1/0009* (2013.01); *H04L 2001/0093* (2013.01)

(58) Field of Classification Search
CPC .. H04L 5/0055; H04L 5/0094; H04W 72/042; H04W 72/1289; H04W 72/23
USPC .......................................................... 370/329
See application file for complete search history.

(56) References Cited

U.S. PATENT DOCUMENTS

| | | | | |
|---|---|---|---|---|
| 2010/0169733 | A1* | 7/2010 | Kim | ...................... H04L 1/1896 |
| | | | | 714/E11.131 |
| 2016/0100422 | A1 | 4/2016 | Papasakellariou et al. | |
| 2016/0302224 | A1* | 10/2016 | Khairmode | ........... H04L 5/0055 |
| 2018/0042043 | A1* | 2/2018 | Babaei | .................. H04L 5/0082 |
| 2018/0176945 | A1* | 6/2018 | Cao | ........................ H04L 5/0044 |
| 2018/0206225 | A1* | 7/2018 | Li | ........................ H04L 1/1861 |
| 2018/0220408 | A1* | 8/2018 | Novak | .................. H04L 1/0003 |
| 2018/0270722 | A1* | 9/2018 | Kim | ...................... H04W 36/08 |
| 2018/0279274 | A1* | 9/2018 | Sun | ........................ H04L 1/1864 |
| 2019/0132824 | A1* | 5/2019 | Jeon | ........................ H04L 5/00 |
| 2019/0149279 | A1* | 5/2019 | Lee | ........................ H04L 1/1822 |
| | | | | 370/329 |
| 2019/0245648 | A1* | 8/2019 | Jo | ........................ H04L 5/0094 |
| 2019/0246416 | A1* | 8/2019 | Park | ........................ H04W 72/1278 |
| 2020/0275417 | A1* | 8/2020 | Takeda | ...................... H04L 5/14 |
| 2020/0404684 | A1* | 12/2020 | Lee | ........................ H04L 1/1896 |
| 2021/0211913 | A1* | 7/2021 | Takeda | ................ H04W 72/042 |

OTHER PUBLICATIONS

International Search Report and Written Opinion—PCT/US2019/012824—ISA/EPO—Apr. 12, 2019 (181317WO).

* cited by examiner

GROUP COMMON CONTROL CHANNEL IN ULTRA-RELIABLE/LOW-LATENCY COMMUNICATIONS

CROSS REFERENCES

The present Application for Patent claims the benefit of U.S. Provisional Patent Application No. 62/617,441 by GUPTA, et al., entitled "GROUP COMMON CONTROL CHANNEL IN ULTRA-RELIABLE/LOW-LATENCY COMMUNICATIONS," filed Jan. 15, 2018, assigned to the assignee hereof, and expressly incorporated by reference herein.

BACKGROUND

The following relates generally to wireless communication, and more specifically to group common control channel in ultra-reliable/low-latency communications (URLLC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communications systems may be configured to support URLLC communications. Such communications may be associated with stringent latency and reliability requirements and may be utilized in a variety of scenarios, such as emergency management communications, vehicle-based communications, factory automation communications, and the like. Some URLLC communications may be suitable for semi-persistent scheduling (SPS) protocols. For example, the URLLC communications may be periodic in nature, may involve a rather consistent or small amount of data to be communicated, and the like. SPS protocols typically include preconfigured resources that are used for the URLLC communications.

One issue that may arise in the above scenario is when SPS messages are not received and/or decoded by the receiving device (e.g., a UE). In this instance, the UE may transmit a negative acknowledge (NACK) message to the base station indicating that the SPS message was not received and/or decoded. In response, the base station may allocate new resources to retransmit the SPS message (e.g., resources outside of the preconfigured SPS resources), and transmit an indication of the resources in a new grant to the UE. While this may be acceptable in some scenarios, it may be inefficient in a deployment scenario involving many UEs transmitting NACK messages. According to conventional protocols, the retransmission resource grant is on a per-UE basis. When there are many UEs, the control channel may be overwhelmed or, in some instances, may not have sufficient resources available to transmit all of the grant messages. This situation may be even further exacerbated in the situation where some or all of the UEs transmitting NACK messages have high aggregation levels.

SUMMARY

The described techniques relate to improved methods, systems, devices, or apparatuses that support group common control channel in ultra-reliable/low-latency communications (URLLC). Generally, the described techniques provide for use of a group downlink control channel that includes information from which each user equipment (UE) transmitting a negative acknowledgement (NACK) message can determine its unique retransmission resource assignment. For example, the base station and a set of UEs may be performing URLLC communications using semi-persistent scheduling (SPS) protocols. This may include the base station transmitting respective SPS messages to the set of UEs using resources corresponding to each UE, e.g., the preconfigured SPS resources for each UE. The base station may receive NACK messages from a subset of UEs in the set of UEs corresponding to a respective SPS message. In response, the base station may transmit a downlink control message that includes or otherwise provides an indication of a downlink resource configuration to be used for retransmission of the respective SPS messages. The base station may then retransmit the SPS messages to the subset of UEs according to the downlink resource configuration. Accordingly, the group downlink control message may provide a more efficient mechanism for a base station to allocate retransmission resources and provide an indication of the allocated resources to the subset of UEs.

A method of wireless communication is described. The method may include transmitting SPS messages to a set of UEs using respective resources corresponding to each UE, receiving, from each of a subset of UEs from the set of UEs, a NACK message associated with the SPS messages, transmitting a group downlink control message including information associated with a downlink resource configuration for retransmission of the respective SPS messages to the subset of UEs, and retransmitting SPS messages to each of the subset of UEs using the downlink resource configuration.

An apparatus for wireless communication is described. The apparatus may include means for transmitting SPS messages to a set of UEs using respective resources corresponding to each UE, means for receiving, from each of a subset of UEs from the set of UEs, a NACK message associated with the SPS messages, means for transmitting a group downlink control message including information associated with a downlink resource configuration for retransmission of the respective SPS messages to the subset of UEs, and means for retransmitting SPS messages to each of the subset of UEs using the downlink resource configuration.

Another apparatus for wireless communication is described. The apparatus may include a processor, memory in electronic communication with the processor, and instructions stored in the memory. The instructions may be operable to cause the processor to transmit SPS messages to a set of UEs using respective resources corresponding to each UE, receive, from each of a subset of UEs from the set of UEs, a NACK message associated with the SPS messages, transmit a group downlink control message including information associated with a downlink resource configuration for retransmission of the respective SPS messages to the subset of UEs, and retransmit SPS messages to each of the subset of UEs using the downlink resource configuration.

A non-transitory computer-readable medium for wireless communication is described. The non-transitory computer-readable medium may include instructions operable to cause a processor to transmit SPS messages to a set of UEs using respective resources corresponding to each UE, receive, from each of a subset of UEs from the set of UEs, a NACK message associated with the SPS messages, transmit a group downlink control message including information associated with a downlink resource configuration for retransmission of the respective SPS messages to the subset of UEs, and retransmit SPS messages to each of the subset of UEs using the downlink resource configuration.

Some examples of the method, apparatus, and non-transitory computer-readable medium described above may further include processes, features, means, or instructions for transmitting, to the set of UEs, an indication of one or more rules to be applied to the information included in the group downlink control message in determining the downlink resource configuration to be used for retransmission of the SPS messages to the subset of UEs.

In some examples of the method, apparatus, and non-transitory computer-readable medium described above, at least one rule includes evenly dividing a set of available resources between the UEs in the subset of UEs.

In some examples of the method, apparatus, and non-transitory computer-readable medium described above, at least one rule includes dividing a set of available resources between the UEs in the subset of UEs based at least in part on a number of resource blocks that may be associated with each UE in the subset of UEs.

Some examples of the method, apparatus, and non-transitory computer-readable medium described above may further include processes, features, means, or instructions for transmitting, to the set of UEs, an indication of a set of available downlink resource configurations to be applied to the information included in the group downlink control message in determining the downlink resource configuration to be used for retransmission of the SPS messages to the subset of UEs.

Some examples of the method, apparatus, and non-transitory computer-readable medium described above may further include processes, features, means, or instructions for selecting from a preconfigured table a set of available downlink resource configurations to be applied to the information included in the group downlink control message in determining the downlink resource configuration to be used for retransmission of the SPS messages to the subset of UEs.

Some examples of the method, apparatus, and non-transitory computer-readable medium described above may further include processes, features, means, or instructions for configuring the group downlink control message to indicate a number of resource blocks that may be associated with each UE in the subset of UEs.

In some examples of the method, apparatus, and non-transitory computer-readable medium described above, the information associated with the downlink resource configuration comprises a bitmap corresponding to which UEs in the set of UEs that NACK messages were received from and which UEs in the set of UEs that acknowledgement (ACK) messages were received from.

Some examples of the method, apparatus, and non-transitory computer-readable medium described above may further include processes, features, means, or instructions for transmitting the SPS messages using a first modulation and coding scheme (MCS). Some examples of the method, apparatus, and non-transitory computer-readable medium described above may further include processes, features, means, or instructions for retransmitting the SPS messages using a second MCS that may be different from the first MCS.

Some examples of the method, apparatus, and non-transitory computer-readable medium described above may further include processes, features, means, or instructions for transmitting a first uplink resource configuration to trigger uplink SPS messages from the set of UEs, receiving the uplink SPS messages from the set of UEs, determining that at least one uplink SPS message from at least one respective UE from the set of UEs was not received, transmitting a second uplink resource configuration including information indicating an uplink resource configuration for retransmission of uplink SPS messages by the at least one respective UE, and receiving the retransmission of uplink SPS messages from the at least one respective UE.

In some examples of the method, apparatus, and non-transitory computer-readable medium described above, the group downlink control message includes a group common physical downlink control channel (GC-PDCCH) message.

A method of wireless communication is described. The method may include transmitting a NACK message associated with a SPS message, receiving, in response to the NACK message, a group downlink control message including information associated with a downlink resource configuration for retransmission of the SPS message to the UE, identifying the downlink resource configuration based at least in part on the group downlink control message, and receiving a retransmission of the SPS message using the downlink resource configuration.

An apparatus for wireless communication is described. The apparatus may include means for transmitting a NACK message associated with a SPS message, means for receiving, in response to the NACK message, a group downlink control message including information associated with a downlink resource configuration for retransmission of the SPS message to the UE, means for identifying the downlink resource configuration based at least in part on the group downlink control message, and means for receiving a retransmission of the SPS message using the downlink resource configuration.

Another apparatus for wireless communication is described. The apparatus may include a processor, memory in electronic communication with the processor, and instructions stored in the memory. The instructions may be operable to cause the processor to transmit a NACK message associated with a SPS message, receive, in response to the NACK message, a group downlink control message including information associated with a downlink resource configuration for retransmission of the SPS message to the UE, identify the downlink resource configuration based at least in part on the group downlink control message, and receive a retransmission of the SPS message using the downlink resource configuration.

A non-transitory computer-readable medium for wireless communication is described. The non-transitory computer-readable medium may include instructions operable to cause a processor to transmit a NACK message associated with a SPS message, receive, in response to the NACK message, a group downlink control message including information associated with a downlink resource configuration for retransmission of the SPS message to the UE, identify the downlink resource configuration based at least in part on the group downlink control message, and receive a retransmission of the SPS message using the downlink resource configuration.

Some examples of the method, apparatus, and non-transitory computer-readable medium described above may further include processes, features, means, or instructions for receiving an indication of one or more rules to be applied to the information included in the group downlink control message in identifying the downlink resource configuration to be used for retransmission of the SPS message.

In some examples of the method, apparatus, and non-transitory computer-readable medium described above, at least one rule includes evenly dividing a set of available resources between one or more UEs in a subset of UEs transmitting NACK messages.

In some examples of the method, apparatus, and non-transitory computer-readable medium described above, at least one rule includes dividing a set of available resources between one or more UEs in a subset of UEs transmitting NACK messages, the dividing based at least in part on a number of resource blocks that may be associated with each UE in the subset of UEs.

Some examples of the method, apparatus, and non-transitory computer-readable medium described above may further include processes, features, means, or instructions for receiving an indication of a set of available downlink resource configurations to be applied to the information included in the group downlink control message in identifying the downlink resource configuration to be used for retransmission of the SPS message.

Some examples of the method, apparatus, and non-transitory computer-readable medium described above may further include processes, features, means, or instructions for selecting from a preconfigured table a set of available downlink resource configurations to be applied to the information included in the group downlink control message in identifying the downlink resource configuration to be used for retransmission of the SPS message.

Some examples of the method, apparatus, and non-transitory computer-readable medium described above may further include processes, features, means, or instructions for decoding the group downlink control message to identify a number of resource blocks that may be associated with the UE.

Some examples of the method, apparatus, and non-transitory computer-readable medium described above may further include processes, features, means, or instructions for receiving the SPS message using a first MCS. Some examples of the method, apparatus, and non-transitory computer-readable medium described above may further include processes, features, means, or instructions for receiving the retransmission the SPS message using a second MCS that may be different from the first MCS.

DETAILED DESCRIPTION

Figure 1:
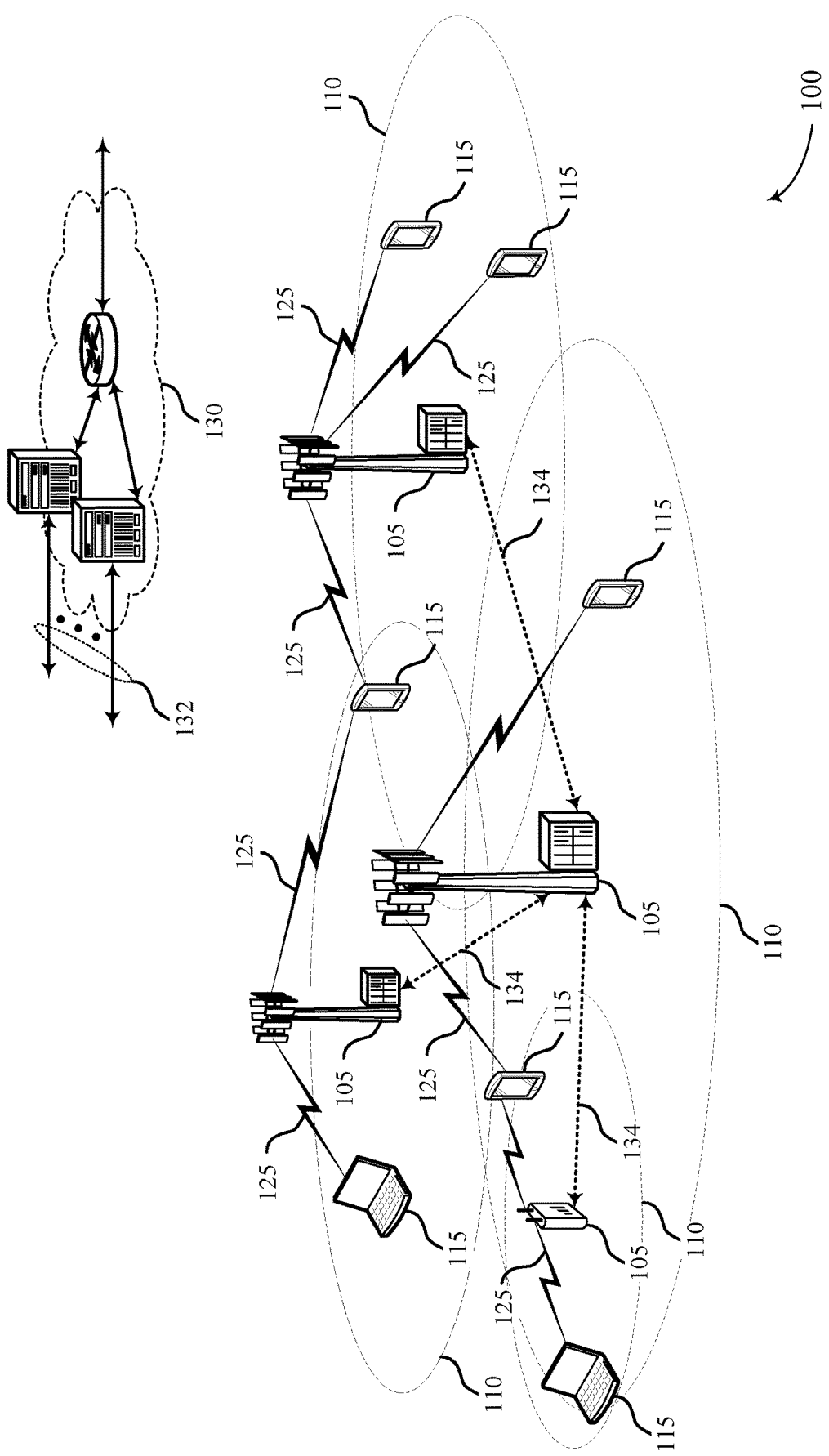
FIG. 1 illustrates an example of a system for wireless communication that supports group common control channel in ultra-reliable/low-latency communications (URLLC) in accordance with aspects of the present disclosure.

Semi-persistent scheduling (SPS) protocols may be implemented in scenarios where ongoing communications are periodic in nature, involve a fixed or predictable amount of data being communicated at any given instance, and the like. SPS resources are typically preconfigured for user equipment (UE) via radio resource control (RRC) signaling, such as during initial bearer establishment. The preconfigured SPS resources are then activated/deactivated for a particular UE in a control signal of the subframe, e.g., in a downlink control information (DCI) trigger. When a UE does not receive and/or cannot decode an SPS message (e.g., a message transmitted using preconfigured SPS resources), the UE may transmit a negative acknowledgment (NACK) message to the base station. In response, the base station may identify and allocate additional resources (e.g., other than the already configured SPS resources) for retransmission of the SPS message. The base station may transmit an indication of the retransmission resources in a downlink grant carried in a control signal of the subframe in which the retransmission will occur.

Some wireless communications may support such SPS protocols for wireless communications having a defined latency requirement, reliability requirement, and the like. One example of such wireless communications may include ultra-reliable/low latency communications (URLLC). Some URLLC deployment scenarios may include a base station communicating with a large number of UEs and/or the UEs communicating directly with each other. In this example, when the SPS messages are not received and/or decoded by a certain number of the UEs, this may result in a large control signal overhead for grant messages conveying retransmission resources to each UE. In some instances, such as when there are a large subset of the UEs transmitting NACK messages and/or the aggregation levels are high, there may not be sufficient control signal resources available to support the grant messages.

Aspects of the disclosure are initially described in the context of a wireless communications system. Aspects of the present disclosure generally provide for a group downlink control message that provides an indication of retransmission resources to individual UEs within a subset of UEs in an SPS environment. For example, a base station may be performing SPS communications with the set of UEs. In some instances, the SPS communications may be URLLC communications, such as in a factory automation setting where the set of UEs is rather large (e.g., 100+ UEs). The base station may transmit SPS messages to the respective UEs in the set of UEs, e.g., each UE might have its own SPS message being transmitted using the preconfigured SPS resources. Some of the UEs, however, may not receive the SPS message and/or may not be able to decode the SPS message, and may therefore respond by transmitting a NACK message. The base station may therefore receive a plurality of NACK messages from a subset of UEs in response to their respective SPS messages.

For each NACK message received by the base station, the base station may elect to retransmit the failed SPS messages. To do so, the base station may transmit a group downlink control message to the subset of UEs. The group downlink control message may carry or otherwise provide an indication of a downlink resource configuration for retransmission of the respective SPS messages to the UEs in the subset of UEs. In one non-limiting example, the group downlink control message may contain a bitmap, where each bit corresponds to an individual UE in the set of UEs and provides an indication of whether the UE has transmitted a NACK message or an acknowledgment (ACK) message. In some aspects, the base station and UEs may be preconfigured (e.g. with a set of rules) to allow the UEs to determine the downlink resource configuration based on the bitmap. Accordingly, each UE in the subset of UEs may be able to use the information associated with the downlink resource configuration indicated in the group downlink control message to identify its resources for the retransmission of their respective SPS message. The base station may retransmit the SPS messages to each UE in the subset of UEs using the respective downlink resource configuration. Thus, the described techniques provide for a single indication from the base station of different retransmission resources for respective UEs without requiring an individual grant message to each UE in the subset of UEs.

Aspects of the disclosure are further illustrated by and described with reference to apparatus diagrams, system diagrams, and flowcharts that relate to group common control channel in URLLC.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may transmit SPS messages to a set of UEs 115 using respective resources corresponding to each UE 115. The base station 105 may receive, from each of a subset of UEs 115 from the set of UEs 115, a NACK message associated with the SPS messages. The base station 105 may transmit a group downlink control message including information associated with a downlink resource configuration for retransmission of the respective SPS messages to the subset of UEs 115. The base station 105 may retransmit SPS messages to each of the subset of UEs 115 using the downlink resource configuration.

Similarly, one or more of the UEs 115 may transmit a NACK message associated with a SPS message. The UE 115 may receive, in response to the NACK message, a group downlink control message including information associated with a downlink resource configuration for retransmission of the SPS message to the UE 115. The UE 115 may identify the downlink resource configuration based at least in part on the group downlink control message. The UE 115 may receive a retransmission of the SPS message using the downlink resource configuration.

Figure 2:
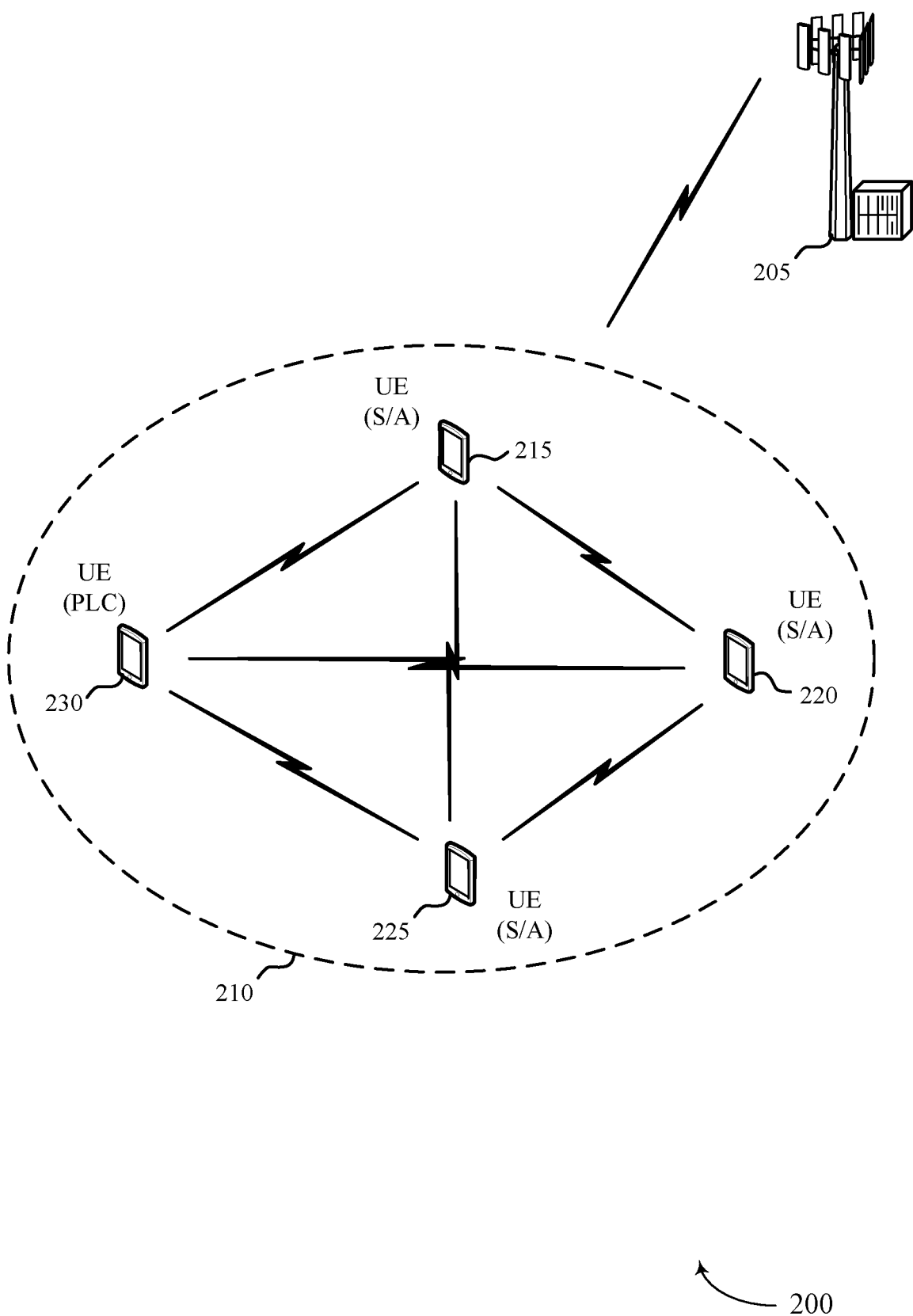
FIG. 2 illustrates an example of a wireless communication system that supports group common control channel in URLLC in accordance with aspects of the present disclosure.

FIG. 2 illustrates an example of a wireless communication system 200 that supports group common control channel in URLLC in accordance with various aspects of the present disclosure. In some examples, wireless communication system 200 may implement aspects of wireless communication system 100. Wireless communication system 200 may include a base station 205 and UEs 215, 220, 225, and 230, which may be examples of the corresponding devices described herein. Broadly, wireless communication system 200 illustrates one example of an environment where SPS protocols are for URLLC communications.

By way of example only, the UEs 215, 220, 225, and 230 may be associated with a particular zone 210, such as a zone within a factory automation setting. In this example, the UEs may perform wireless communications with each other and/or with base station 205. In some aspects, the wireless communications may be SPS based communications that support defined latency and/or liability requirements. Thus, base station 205 may perform communications with one or more of UEs 215, 220, 225, and/or 230. In some aspects, the SPS communications may be between one or more of the UEs. For example, some of the UEs (e.g., UEs 215, 220, and 225) may be configured as sensors/actuators (S/A) that perform various function within the factory automation setting. Other UEs, such as UE 230, may be configured as a process loop controller (PLC) that oversees and/or manages aspects of one or more S/A UEs. Although four UEs are shown within zone 210, it is to be understood that more or fewer UEs may be utilized in accordance with aspects of the present disclosure. In ono non-limiting example, a factory automation setting may include hundreds or even thousands of UEs within a zone 210. In some aspects, the UEs within the zone 210 may be considered a set of UEs that base station 205 is performing SPS communications with.

In some aspects, base station 205 may configure the UEs within zone 210 for SPS communications. For example, base station 205 may use RRC signaling to provide an indication of the pre-configured SPS resources to be used for the SPS communications between one or more of the UEs and base station 205 and/or inter-communications between the UEs. Base station 205 may activate/deactivate the pre-configured SPS resources for one or more UEs for a particular subframe by including a trigger in the DCI of the subframe. For example, the base station may transmit a DCI in a PDCCH control signal in each UE may attempt to decode the PDCCH by unscrambling a cyclic redundancy check (CRC) using a SPS cell radio network temporary identifier (SPS C-RNTI).

In some aspects, base station 205 may configure the UEs within zone 210 with rules to be applied to information included in a group downlink control message. The rules may allow the UEs in the zone 210 that have transmitted NACK messages responsive to an SPS message to identify a downlink resource configuration to be used for retransmission of the SPS message. For example, the rules may be configured in RRC signaling, may be preconfigured (e.g., from a service provider), and the like. The rules may allow or otherwise provide a mechanism for each UE in the subset of UEs to identify from a group downlink control message unique resources for retransmission of their respective SPS messages. In some aspects, the rules may generally provide an indication of how available retransmission resources are to be divided amongst the UEs in the subset of UEs period In some aspects, the rules may be associated with one or more preconfigured tables for a set of available downlink resource configurations that can be applied to the information included in the group downlink control message.

Accordingly, base station 205 may transmit SPS messages to the set of UEs using respective resources corresponding to each UE, e.g., the resources that have been preconfigured for each UE. In the example wireless communication system 200, this may include base station 205 transmitting respective SPS messages to each of UEs 215, 220, 225, and 230. Some of the UEs in the set of UEs may receive the SPS messages and respond by transmitting ACK messages to base station 205. Other UEs, however, in the set of UEs may not receive the SPS messages and/or may not be able to decode the SPS messages and may therefore respond by transmitting NACK messages for their respective SPS messages. The UEs transmitting the NACK messages may be considered a subset of UEs.

Based on which UEs transmit NACK messages, base station 205 may configure a group downlink control message to include or otherwise convey an indication of information associated with the downlink resource configuration. The downlink resource configuration may broadly refer to resources to be used for retransmission of the SPS messages to the respective UEs in the subset of UEs. The downlink resource configuration may provide an indication of retransmission resources that are unique to each UE in the subset of UEs. In one non-limiting example, the group downlink control message may also provide an indication of how many resource blocks that are associated with each UE in the subset of UEs, e.g., the resource block count for the SPS message retransmissions.

The UEs in the subset of UEs may receive the group downlink control message and use the information associated with the downlink resource configuration to identify which downlink resource configuration will be used for retransmission of the UE's respective SPS message. For example, each UE may use the information associated with the downlink resource configuration in combination with one or more rules to identify or otherwise select the downlink resource configuration. In some aspects, the downlink resource configuration may include some, all, or none of the downlink resource configuration that was used for transmission of the original SPS message. In some aspects, the group downlink control message may be transmitted in a group common PDCCH (GC-PDCCH), or some other similar group control signal. The base station 205 may then retransmit the respective SPS messages to the UEs in the subset of UEs according to each UEs corresponding downlink resource configuration. The UEs in the subset of UEs may know, based on the identified downlink resource configuration, which resources are being used for their respective SPS message retransmission. In some aspects, the SPS messages may be retransmitted using the same, or a different MCS as the original SPS message transmission.

Thus, aspects of the present disclosure provide for, instead of sending separate individual PDCCH to each UE (e.g., S/A) in the subset of UEs which transmitted NACK messages, a group PDCCH is sent (e.g., the group downlink control message). Otherwise, if a base station were to allocate new resources to retransmit SPS messages, it may be inefficient in a deployment scenario involving many UEs transmitting NACK messages. The group PDCCH may contain information from which each UE in the subset of UEs can derive its retransmission resource assignment uniquely. In some examples, a single CRC may be attached to the group PDCCH (which may reduce the control overhead significantly). In some aspects, even the group PDCCH payload itself may be significantly reduced as compared to separate PDCCHs for each UE in the subset of UEs. For instance, the group PDCCH may include a bitmap of UEs sending ACKs. This may be sufficient information, e.g., when each retransmission UE receives the same number of CCEs.

Figure 3:
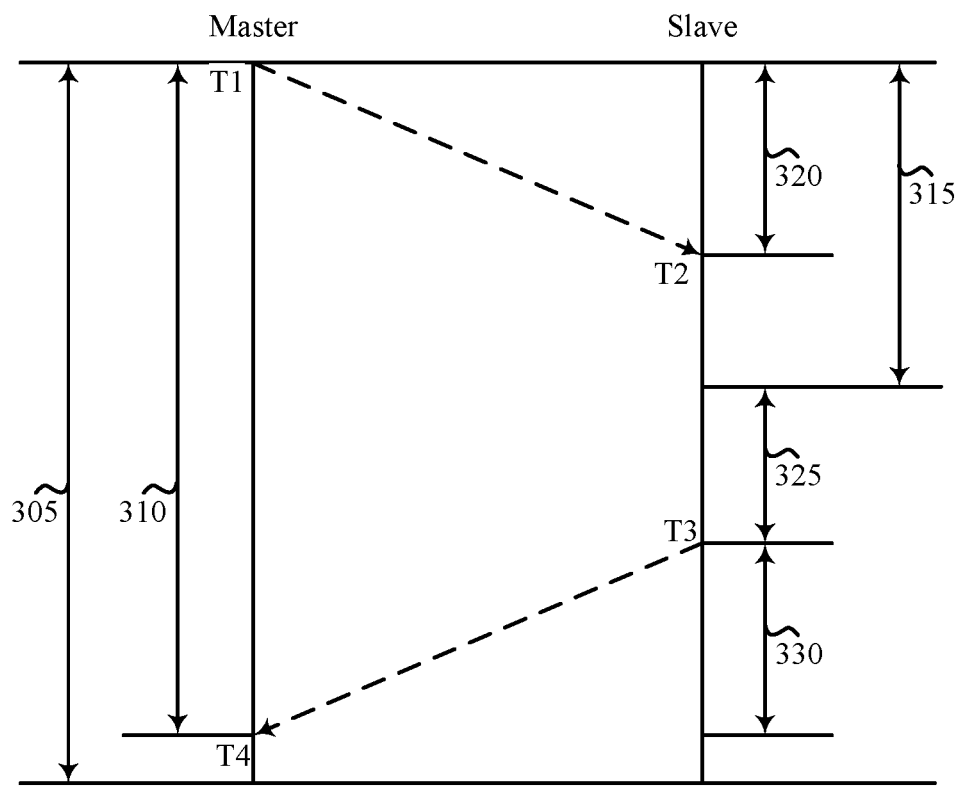
FIG. 3 illustrates an example of a timing diagram that supports group common control channel in URLLC in accordance with aspects of the present disclosure.

FIG. 3 illustrates an example of a timing diagram 300 that supports group common control channel in URLLC in accordance with various aspects of the present disclosure. In some examples, timing diagram 300 may implement aspects of wireless communication systems 100/200. Aspects of timing diagram 300 may be implemented by a UE and/or a base station, which may be examples of the corresponding devices described herein.

Broadly, timing diagram 300 illustrates a sample exchange between a master device (such as a PLC) and a slave device (such as an S/A). Each of the master and slave devices may have an applications layer with one or more logical connections between the devices. Each of the master and slave devices may be associated with a communication system, such as a cellular wireless communication system, that exchanges data over one or more channels. Generally, the communication system may refer to wireless communication systems 100/200. Each of the master and slave devices may have a certain predefined set of requirements associated with the device and/or communications between the devices, e.g., such as URLLC communications.

In the example timing diagram 300, the master device may transmit a signal at T1. The transmitted signal may be a command signal for UEs in the set of UEs to perform a particular function. In some examples, the transmitted signal may be SPS messages to the set of UEs. The transmitted signal may have an associated delay period 320 that corresponds to the time difference between when the time the signal was transmitted at T1 and the time that the signal was received at the slave device at T2. The slave device may process and respond to the signal by transmitting a response signal to the master device at T3. The response signal may have an associated delay period 330 that corresponds to the time difference between when the response signal was transmitted at T3 and when the response signal was received at the master device at T4.

Generally time period 305 may refer to one cycle, which may be the cumulative time that it takes for the master device to transmit the command signal at T1, for the slave device to receive, process, and respond by transmitting a response signal at T3, for the master device to receive the response signal at T4, and for the master device to apply the information included in the response signal, e.g., to process measurement information included in the response signal.

The time period 315 may refer to the time at which slave devices may apply a command synchronously, e.g., the UEs in the set of UEs may apply a command included in the signal transmitted at T1. Time period 310 may refer to the time difference between the master device transmitting the command signal at T1 and when the master device receives the response signal from the slave device at T4. Time period 325 may refer to the time after which slave device applies the command and configures the response signal for transmission at T3.

Figure 4:
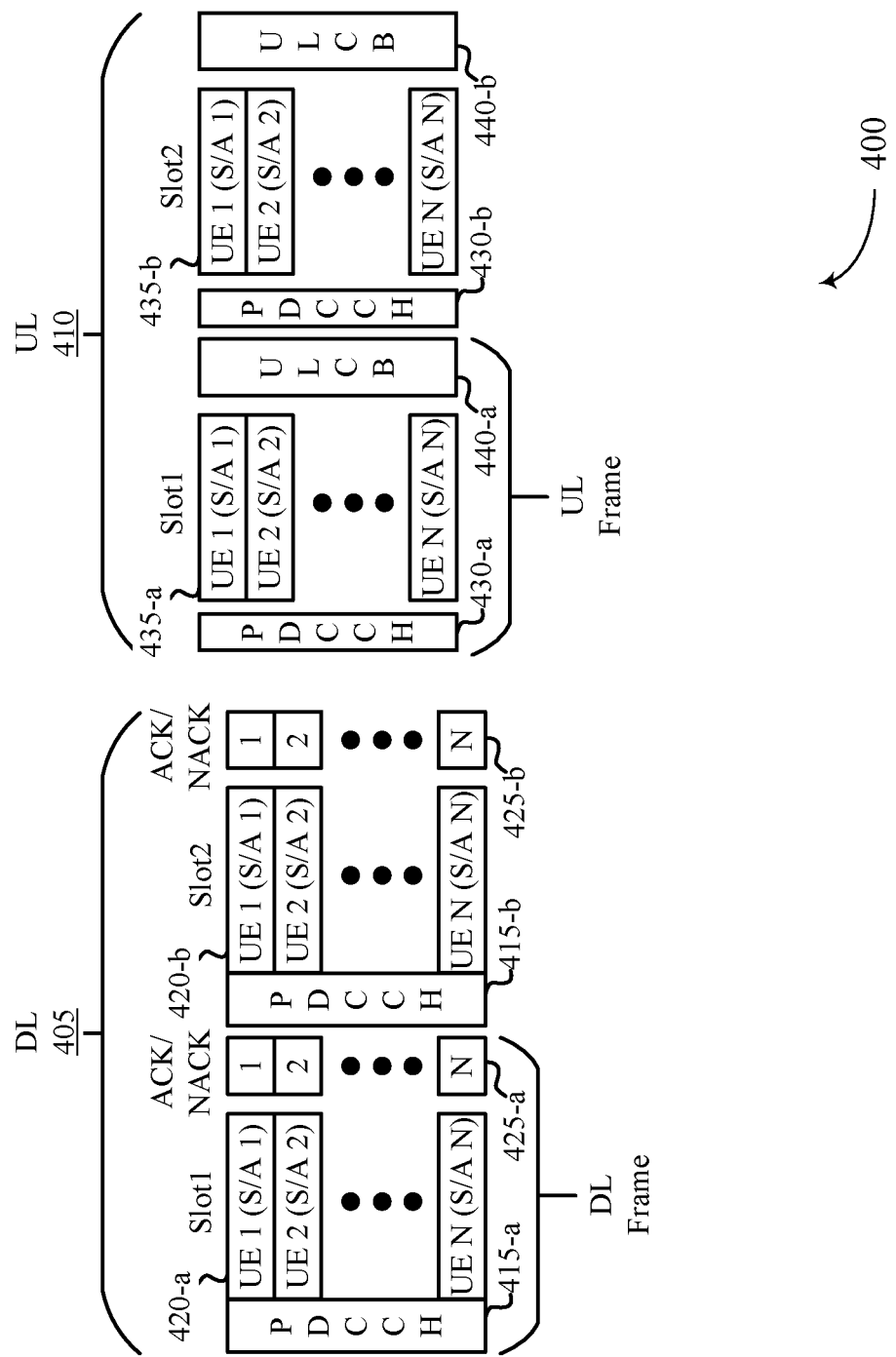
FIG. 4 illustrates an example of a frame structure that supports group common control channel in URLLC in accordance with aspects of the present disclosure.

FIG. 4 illustrates an example of a frame structure 400 that supports group common control channel in URLLC in accordance with various aspects of the present disclosure. In some examples, frame structure 400 may implement aspects of wireless communication system 100. Aspects of frame structure 400 may be implemented by a UE and/or a base station, which may be examples of the corresponding devices described herein.

Frame structure 400 illustrates an example of a downlink frame configuration 405 and uplink frame configuration 410. The downlink frame configuration 405 generally includes two self-contained downlink frames. Each self-contained downlink frame may include a control portion 415 (e.g., PDCCH control signal), a downlink resource configuration 420, and a corresponding ACK/NACK resource 425. Generally, the control portion 415 may carry or otherwise provide an indication of a downlink SPS trigger for UEs within a set of UEs. The SPS trigger may activate the downlink resource configuration 420 for the respective UEs in the set of UEs (e.g., UE 1 through UE N). Thus, UE 1 may have a downlink resource configuration that includes time/frequency resources used for transmission of a downlink SPS message. UE 1 may respond to the SPS message by transmitting an ACK message or a NACK message, depending on whether UE 1 receives and/or decodes the SPS message, using the corresponding ACK/NACK resource 425. Generally, the same procedure is repeated for the second self-contained downlink frame (e.g. slot 2), although some differences may include the use of a group common control message identifying resources to be used for retransmission of the SPS messages to UEs that transmitted NACK messages, as described below.

Uplink frame configuration 410 generally includes two self-contained uplink frames. Each self-contained uplink frame may include a control portion 430 (e.g., PDCCH control signal), an uplink resource configuration 435, and an uplink control block (ULCB) 440. Generally, the control portion 430 may carry or otherwise provided an indication of an uplink SPS trigger for UEs within a set of UEs. The uplink SPS trigger may activate the uplink resource configuration 435 for the respective UEs in the set of UEs (e.g., UE 1 through UE N). Thus, UE 1 may have an uplink resource configuration that includes time/frequency resources used for transmission of an uplink SPS message. UE 1 may transmit a response to the SPS message by receiving an ACK message or a NACK message, depending on whether the base station receives and/or decodes the SPS message, using the control portion 430 in the next self-contained uplink frame. ULCB 440 may provide various uplink control signals, parameters, etc., and, in some examples, may include one or more guard periods to allow for transmission from uplink-to-downlink at one or more of the wireless devices. Generally, the same procedure is repeated for the second self-contained downlink frame (e.g. slot 2).

In some examples, one or more of the uplink SPS messages and/or downlink SPS messages may not be received and/or decoded by the respective receiving device. Accordingly, frame configuration 400 may utilize aspects of the described techniques to provide a group downlink control message to convey an indication of retransmission resources. In a downlink example, the control portion 415 may carry a group downlink control message that includes information associated with a downlink resource configuration 420 for retransmission of respective SPS messages to a subset of UEs. For example, during the first self-contained downlink frame the SPS messages transmitted during slot 1 may be received by some UEs, but not by all of the UEs. Accordingly, those UEs may respond by transmitting a NACK message and the corresponding ACK/NACK resource 425-a to the base station. The UEs transmitting the NACK messages may form a subset of UEs. The base station may respond by transmitting a group downlink control message and the control portion 415-b of the second self-contained downlink frame. The group downlink control message may include information associated with downlink resource configuration 420-b for retransmission of the respective SPS messages to the subset of UEs. The UEs in the subset of UEs may identify their respective downlink resource configuration 420-b based on the information included in the group downlink control message, e.g., access to a lookup table or other reconfiguration rule that ties the information included in the group downlink control message with the corresponding downlink resource configuration 420-b. Accordingly, the base station may retransmit the SPS messages to each UE in the subset of UEs using the downlink resource configuration 420-b.

In an uplink example, the base station may transmit an SPS trigger in the control portion 430-a of the first self-contained uplink frame that triggers uplink SPS message transmissions using the preconfigured uplink resource configurations 435-a for the triggered UEs. The base station may respond to the received SPS messages by transmitting ACK/NACK information in the control portion 430-b of the next self-contained uplink frame. The ACK/NACK information carried or otherwise indicated in the control portion 430-b may be considered in the group downlink control message in this context that includes information associated with an uplink resource configuration 435-b for retransmission of the respective SPS messages from the subset of UEs. Accordingly, the UEs in the subset of UEs may identify the corresponding uplink resource configuration 435-b and use these resources to retransmit the uplink SPS messages.

Figure 5:
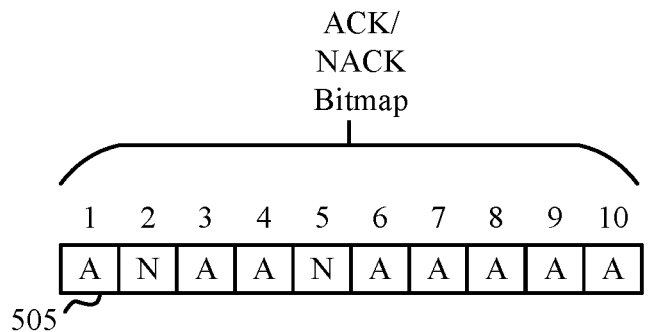
FIG. 5 illustrates an example of a retransmission resource configuration that supports group common control channel in URLLC in accordance with aspects of the present disclosure.
Figure 5:
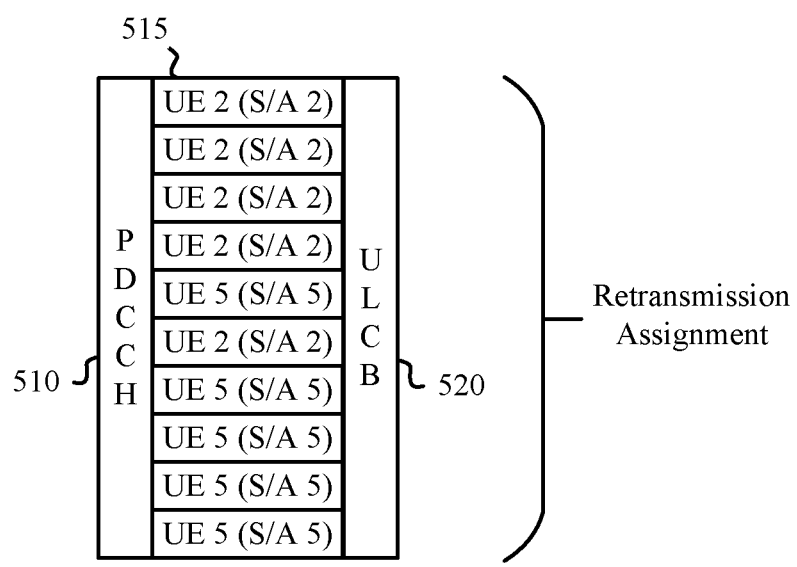

FIG. 5 illustrates an example of a retransmission resource configuration 500 that supports group common control channel in URLLC in accordance with various aspects of the present disclosure. In some examples, retransmission resource configuration 500 may implement aspects of wireless communication systems 100/200, timing diagram 300, and/or frame configuration 400. Aspects of retransmission resource configuration 500 may be implemented by UE and/or a base station, which may be examples of the corresponding devices described herein.

Generally, retransmission resource configuration 500 illustrates an ACK/NACK bitmap that may be indicated in a group downlink control message. For example, a base station may transmit SPS messages to (or receive SPS messages from) a set of UEs using respective resources corresponding to each UE. In a downlink situation, the base station may receive individual ACK messages or NACK messages from the UEs in the set of UEs responsive to the SPS messages. In an uplink situation, the base station may provide an indication of ACK/NACK to the set of UEs. An ACK message provides an indication that a UE (in the downlink scenario) or the base station (in an uplink scenario) received and successfully decoded its SPS message. Correspondingly, a NACK message provides an indication that the SPS message was not received and/or was not able to be successfully decoded. The base station may respond by transmitting a group downlink control messages to the UEs in the set of UEs. In one example, the group downlink control message may include information associated with downlink resource configuration for retransmission of the respective SPS messages. For example, the base station may transmit the ACK/NACK bitmap of retransmission resource configuration 500 that provides the indication of the information associated with the downlink resource configurations.

In some aspects, the ACK/NACK bitmap includes a plurality of bits 505, where each bit 505 corresponds to a particular UE in the set of UEs. Thus, the first bit may correspond to UE 1, the second bit may correspond to UE 2, and so forth. Generally, the presence or absence of a bit for the respective UE may be based on whether the base station received an ACK message or a NACK message from that UE (in the downlink scenario) or of whether the base station was able to receive and decode the SPS messages received from UEs (in an uplink scenario). Thus, in the example ACK/NACK bitmap indicates that the base station received ACK messages from UEs 1, 3, 4, and 6-10 and received NACK messages from UEs 2 and 5 (in a downlink scenario) or that the base station is providing an ACK indication to UEs 1, 3, 4, and 6-10 and providing a NACK indication to UEs 2 and 5 (in an uplink scenario).

In some aspects, the base station and UEs in the set of UEs may be configured with one or more sets of rules to be applied to the information included in the group downlink control message (e.g., to the ACK/NACK bitmap) in determining the downlink resource configuration to be used for retransmission of the SPS messages. Generally, the rules may provide an indication of how available resources (including resources that corresponded to SPS messages for which ACK messages were received) may be divided among the UEs in the subset of UEs, e.g., evenly divided, based on the resource block count for each UE in the subset of UEs, etc. In one example, this may include a set of available downlink resource configurations to be applied to the information included in the group downlink control message. In some aspects, this may include one or more preconfigured tables that can be used with the information included in the group downlink control message to determine the downlink resource configuration.

Thus, FIG. 5 also illustrates one example of a retransmission assignment (e.g., the downlink resource configuration) to be used for retransmission of the SPS messages. In the example FIG. 5, the SPS message transmission and retransmission are illustrated as uplink SPS messages/retransmissions. Thus, the base station may provide the ACK/NACK bitmap in the control portion 510 (e.g., a PDCCH control signal, such as a GC-PDCCH). The UEs in the subset of UEs (e.g., UEs 2 and 5) may receive the group downlink control message and use the indicated information (e.g., the ACK/NACK bitmap) along with the one or more rules to identify the downlink (or uplink in this case) resource configuration to use for retransmission of the respective SPS messages. In the example of FIG. 5, this may include uplink resources 515 1-4 and 6 being allocated to UE 2 and uplink resources 515 5 and 6-10 being allocated to UE 5. Thus, UEs 2 and 5 may use the identified downlink (or uplink in this example) resource configurations to retransmit the SPS messages to the base station. The retransmission assignment may also include an ULCB 520, as is described with reference to FIG. 4.

Figure 6:
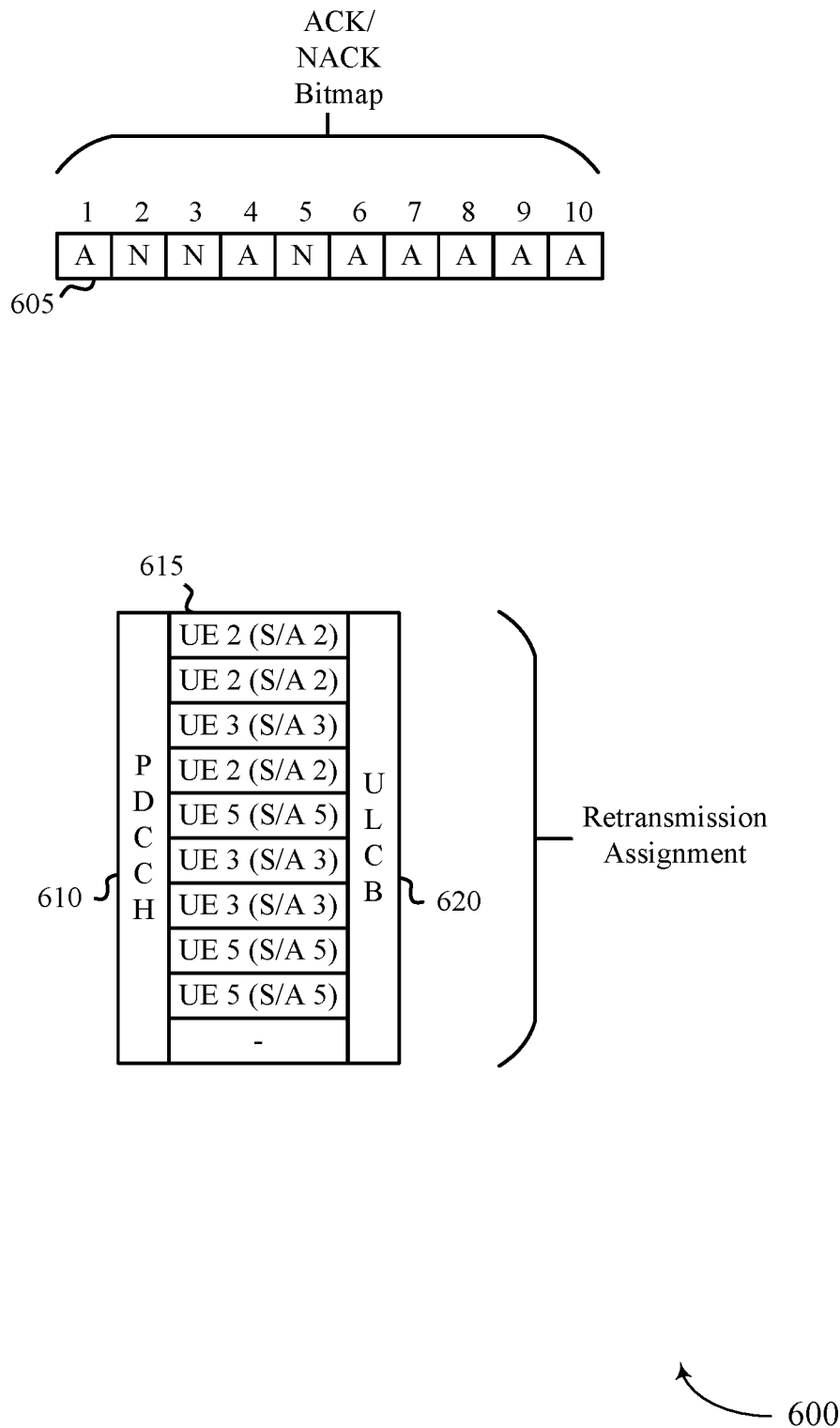
FIG. 6 illustrates an example of a retransmission resource configuration that supports group common control channel in URLLC in accordance with aspects of the present disclosure.

FIG. 6 illustrates an example of a retransmission resource configuration 600 that supports group common control channel in URLLC in accordance with various aspects of the present disclosure. In some examples, retransmission resource configuration 600 may implement aspects of wireless communication systems 100/200, timing diagram 300, and/or frame configuration 400. Aspects of retransmission resource configuration 600 may be implemented by UE and/or a base station, which may be examples of the corresponding devices described herein.

Generally, retransmission resource configuration 600 illustrates an ACK/NACK bitmap that may be indicated in a group downlink control message. For example, a base station may transmit SPS messages to (or receive SPS messages from) a set of UEs using respective resources corresponding to each UE. In a downlink situation, the base station may receive individual ACK messages or NACK messages from the UEs in the set of UEs responsive to the SPS messages. In an uplink situation, the base station may provide an indication of ACK/NACK to the set of UEs. An ACK message provides an indication that a UE (in the downlink scenario) or the base station (in an uplink scenario) received and successfully decoded its SPS message. Correspondingly, a NACK message provides an indication that the SPS message was not received and/or was not able to be successfully decoded. The base station may respond by transmitting a group downlink control message to the UEs in the set of UEs. In one example, the group downlink control message may include information associated with downlink resource configurations for retransmission of the respective SPS messages. For example, the base station may transmit the ACK/NACK bitmap of retransmission resource configuration 600 that provides the indication of the information associated with the downlink resource configurations.

In some aspects, the ACK/NACK bitmap includes a plurality of bits 605, where each bit 605 corresponds to a particular UE in the set of UEs. Thus, the first bit may correspond to UE 1, the second bit may correspond to UE 2, and so forth. Generally, the presence or absence of a bit for the respective UE may be based on whether the base station received an ACK message or a NACK message from that UE (in the downlink scenario) or of whether the base station was able to receive and decode the SPS messages received from UEs (in an uplink scenario). Thus, in the example ACK/NACK bitmap indicates that the base station received ACK messages from UEs 1, 4, and 6-10 and received NACK messages from UEs 2, 3, and 5 (in a downlink scenario) or that the base station is providing an ACK indication to UEs 1, 4, and 6-10 and providing a NACK indication to UEs 2, 3, and 5 (in an uplink scenario).

In some aspects, the base station and UEs in the set of UEs may be configured with one or more sets of rules to be applied to the information included in the group downlink control message (e.g., to the ACK/NACK bitmap) in determining the downlink resource configuration to be used for retransmission of the SPS messages. Generally, the rules may provide an indication of how available resources (including resources that corresponded to SPS messages for which ACK messages were received) may be divided among the UEs in the subset of UEs, e.g., evenly divided, based on the resource block count for each UE in the subset of UEs, etc. In one example, this may include a set of available downlink resource configurations to be applied to the information included in the group downlink control message. In some aspects, this may include one or more preconfigured tables that can be used with the information included in the group downlink control message to determine the downlink resource configuration.

Thus, FIG. 6 also illustrates one example of a retransmission assignment (e.g., the downlink resource configuration) to be used for retransmission of the SPS messages. In the example FIG. 6, the SPS message transmission and retransmission are illustrated as uplink SPS messages/retransmissions. Thus, the base station may provide the ACK/NACK bitmap in the control portion 610 (e.g., a PDCCH control signal, such as a GC-PDCCH). The UEs in the subset of UEs (e.g., UEs 2, 3, and 5) may receive the group downlink control message and use the indicated information (e.g., the ACK/NACK bitmap) along with the one or more rules to identify the downlink (or uplink in this case) resource configuration to use for retransmission of the respective SPS messages. In the example of FIG. 6, this may include uplink resources 615 1, 2, and 4 being allocated to UE 2, uplink resources 615 3, 6, and 7 being allocated to UE 3, and uplink resources 615 5, 8, and 9 being allocated to UE 5. Uplink resource 615 10 may be unallocated. Thus, UEs 2, 3, and 5 may use the identified downlink (or uplink in this example) resource configurations to retransmit the SPS messages to the base station. The retransmission assignment may also include an ULCB 620, as is described with reference to FIG. 4.

Figure 7:
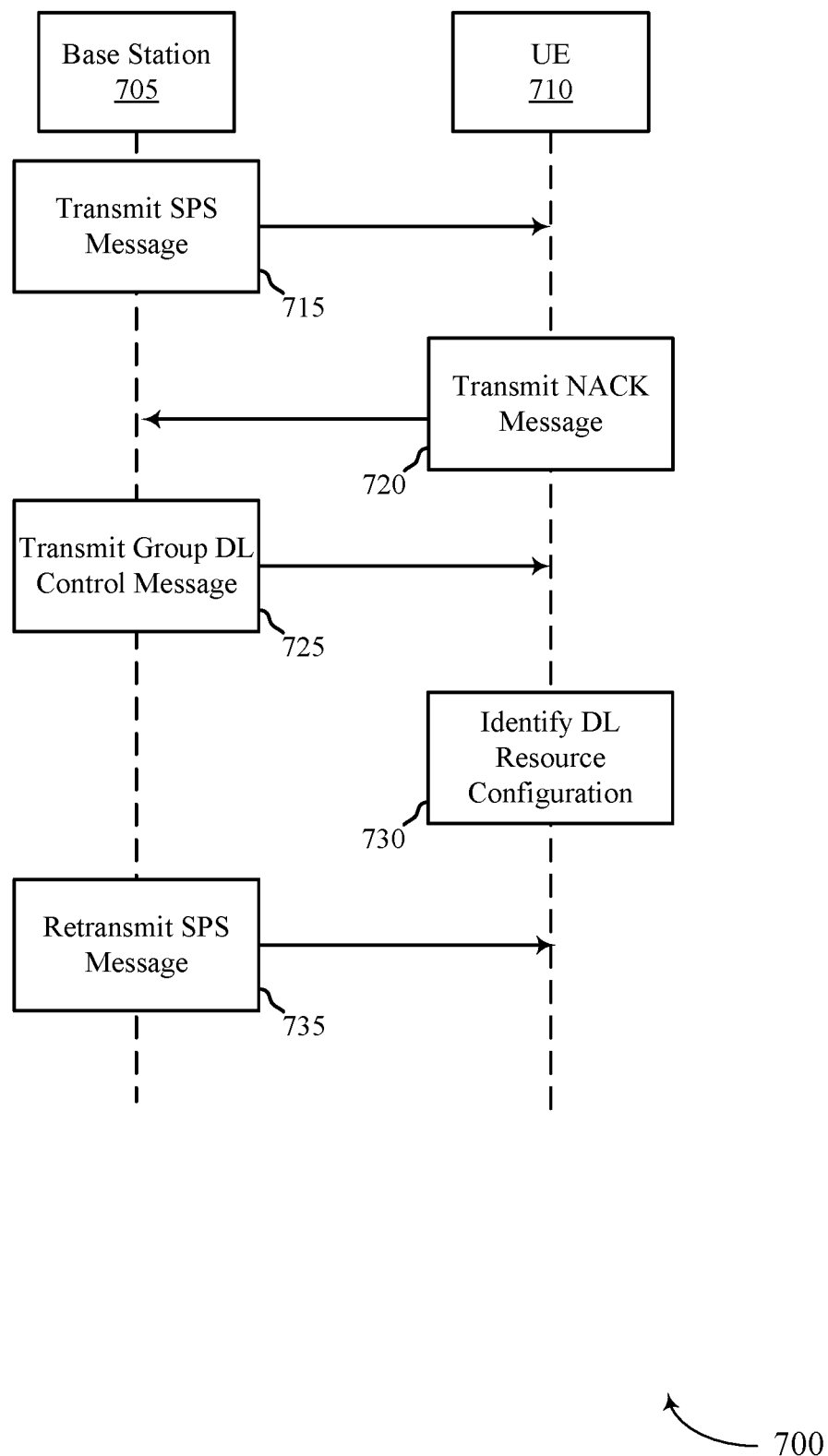
FIG. 7 illustrates an example of a process that supports group common control channel in URLLC in accordance with aspects of the present disclosure.

FIG. 7 illustrates an example of a process 700 that supports group common control channel in URLLC in accordance with various aspects of the present disclosure. In some examples, process 700 may implement aspects of wireless communication systems 100/200, timing diagram 300, frame configuration 400, and/or retransmission resource configurations 500/600. Process 700 may include a base station 705 and a UE 710, which may be examples of corresponding devices described herein.

At 715, base station 705 may transmit (and UE 710 may receive) SPS messages to a set of UEs using respective resources corresponding to each UE. UE 710 may be a UE in the set of UEs.

At 720, UE 710 may transmit (and base station 705 may receive) NACK messages associated with the respective SPS messages. The NACK messages may be received from each UE in a subset of UEs, where UE 710 is a UE in the subset of UEs.

At 725, base station 705 may transmit (and UE 710 may receive) a group downlink control message including information associated with the downlink resource configuration for retransmission of the respective SPS messages to the subset of UEs. In some aspects, they station 705 may configure the group downlink control message to indicate a number resource blocks that are associated with each UE in the subset of UEs. In some aspects, the information associated with that downlink resource configuration may include one or more of a bitmap corresponding to which UEs in the set of UEs that NACK messages were received from and which UEs in the set of UEs ACK messages were received from. In some aspects, the group downlink control message may include a GC-PDCCH message.

At 730, UE 710 may identify the downlink resource configuration based at least in part on the group downlink control message. In some aspects, a station 705 may transmit (and UE 710 may receive) an indication of one or more rules to be applied to the information included in the group downlink control message. UE 710 may use this information in determining the downlink resource configuration to be used for retransmission of the SPS message. An example of one rule may include evenly dividing a set of available resources between the UEs in the subset of UEs. Another example of one rule may include dividing a set of available resources between the UEs in the subset of UEs based at least in part on a number resource blocks that are associated with each UE in the subset of UEs.

In some aspects, base station 705 may transmit (and UE 710 may receive) an indication of a set of available downlink resource configurations to be applied to the information included in the group downlink control message and determining the downlink resource configuration to be used for retransmission of the SPS message. For example, this may include selecting from preconfigured table a set of available resource configurations.

At 735, base station 705 may transmit (and UE 710 may receive) a retransmission of the SPS messages using the downlink resource configuration. In some aspects, the SPS messages may be transmitted using a first MCS and the retransmission of the SPS messages may be transmitted using the first MCS, or a second MCS that is different from the first MCS.

Figure 8:
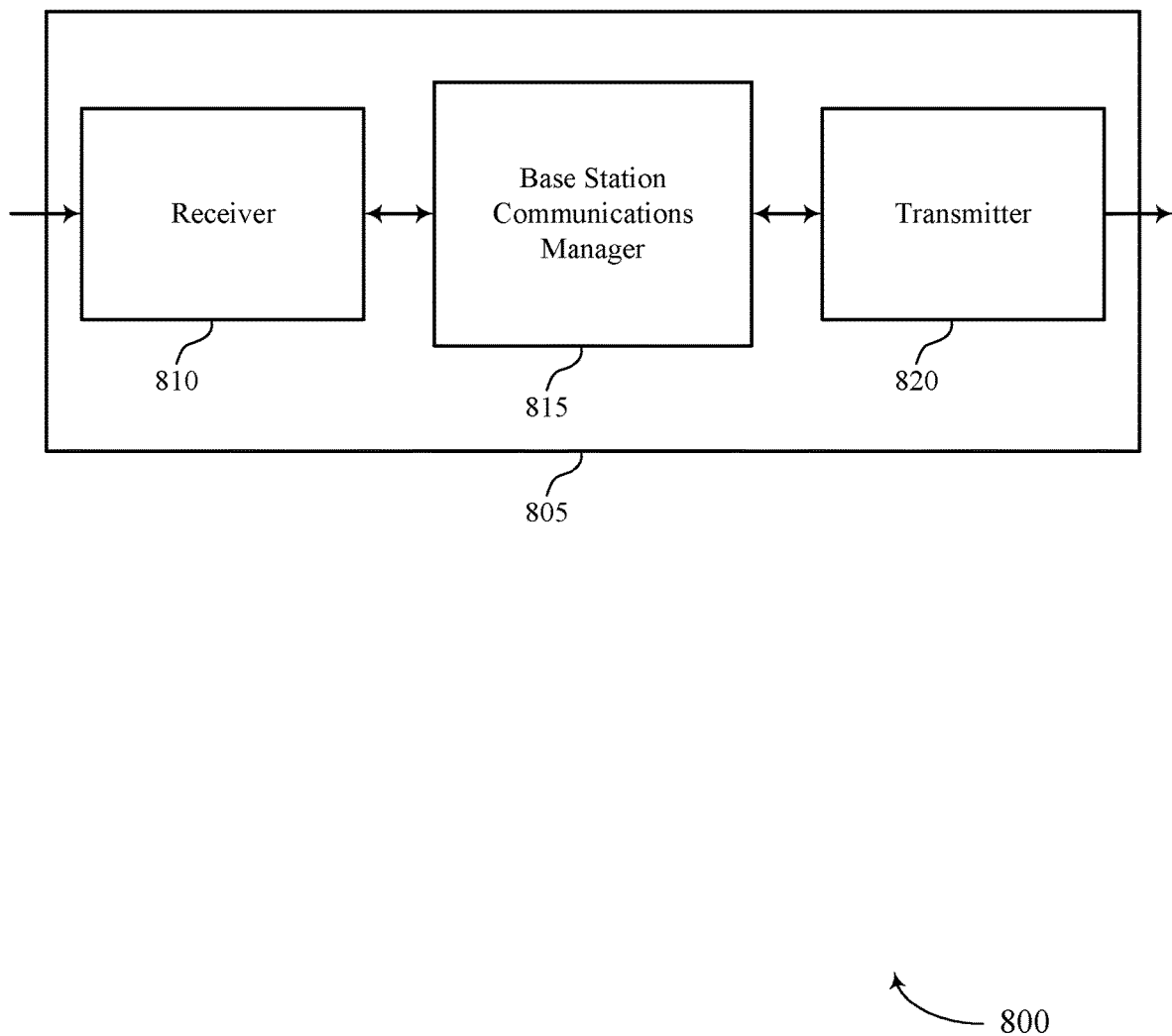
FIGS. 8 through 10 show block diagrams of a device that supports group common control channel in URLLC in accordance with aspects of the present disclosure.

FIG. 8 shows a block diagram 800 of a wireless device 805 that supports group common control channel in URLLC in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to group common control channel in URLLC, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit SPS messages to a set of UEs using respective resources corresponding to each UE, receive, from each of a subset of UEs from the set of UEs, a NACK message associated with the SPS messages, transmit a group downlink control message including information associated with a downlink resource configuration for retransmission of the respective SPS messages to the subset of UEs, and retransmit SPS messages to each of the subset of UEs using the downlink resource configuration.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
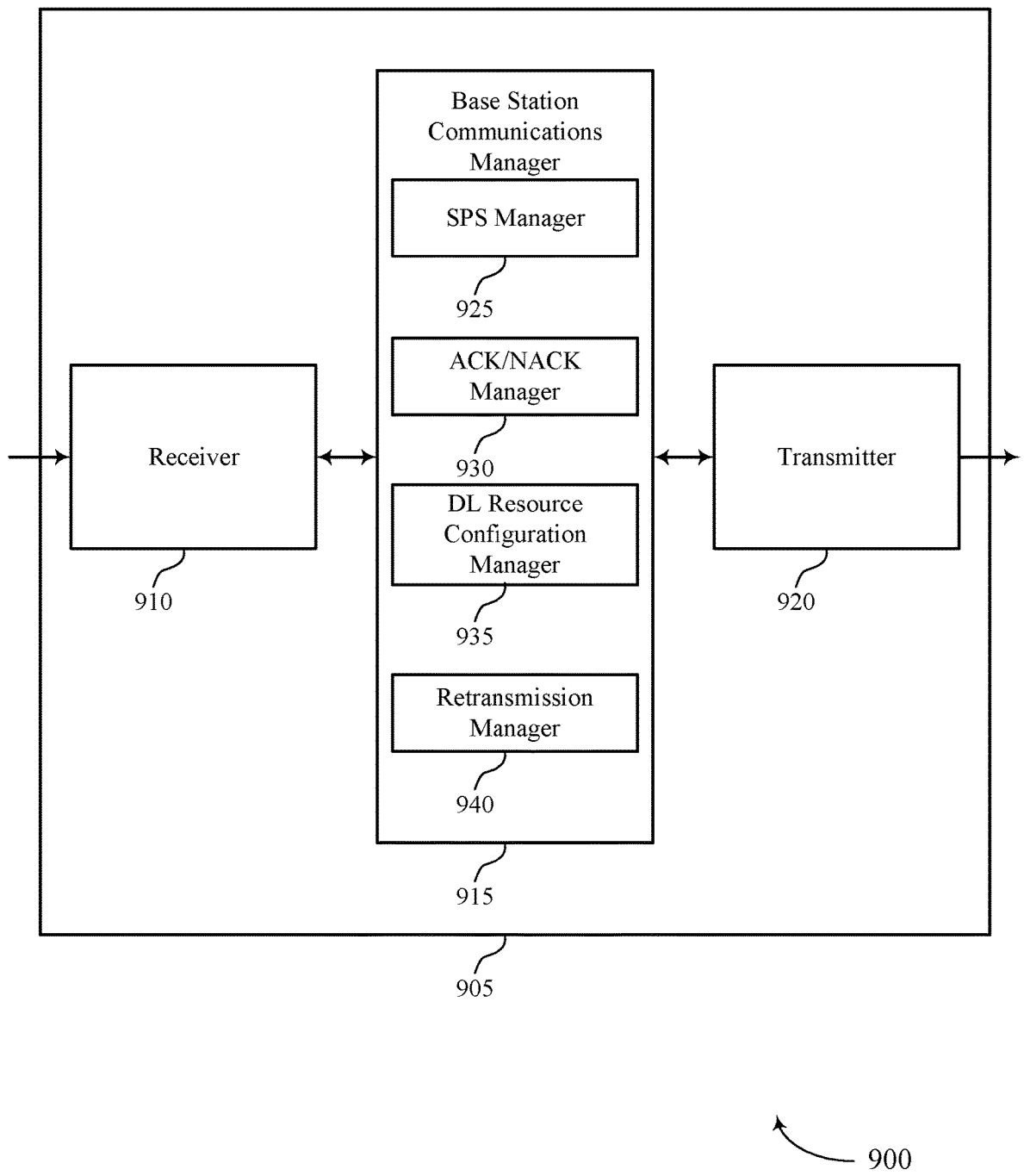

FIG. 9 shows a block diagram 900 of a wireless device 905 that supports group common control channel in URLLC in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to group common control channel in URLLC, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11.

Base station communications manager 915 may also include SPS manager 925, ACK/NACK manager 930, downlink (DL) resource configuration manager 935, and retransmission manager 940.

SPS manager 925 may transmit SPS messages to a set of UEs using respective resources corresponding to each UE.

ACK/NACK manager 930 may receive, from each of a subset of UEs from the set of UEs, a NACK message associated with the SPS messages.

DL resource configuration manager 935 may transmit a group downlink control message including information associated with a downlink resource configuration for retransmission of the respective SPS messages to the subset of UEs. In some cases, the information associated with the downlink resource configuration includes a bitmap corresponding to which UEs in the set of UEs that NACK messages were received from and which UEs in the set of UEs that ACK messages were received from. In some cases, the group downlink control message includes a GC-PDCCH message.

Retransmission manager 940 may retransmit SPS messages to each of the subset of UEs using the downlink resource configuration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
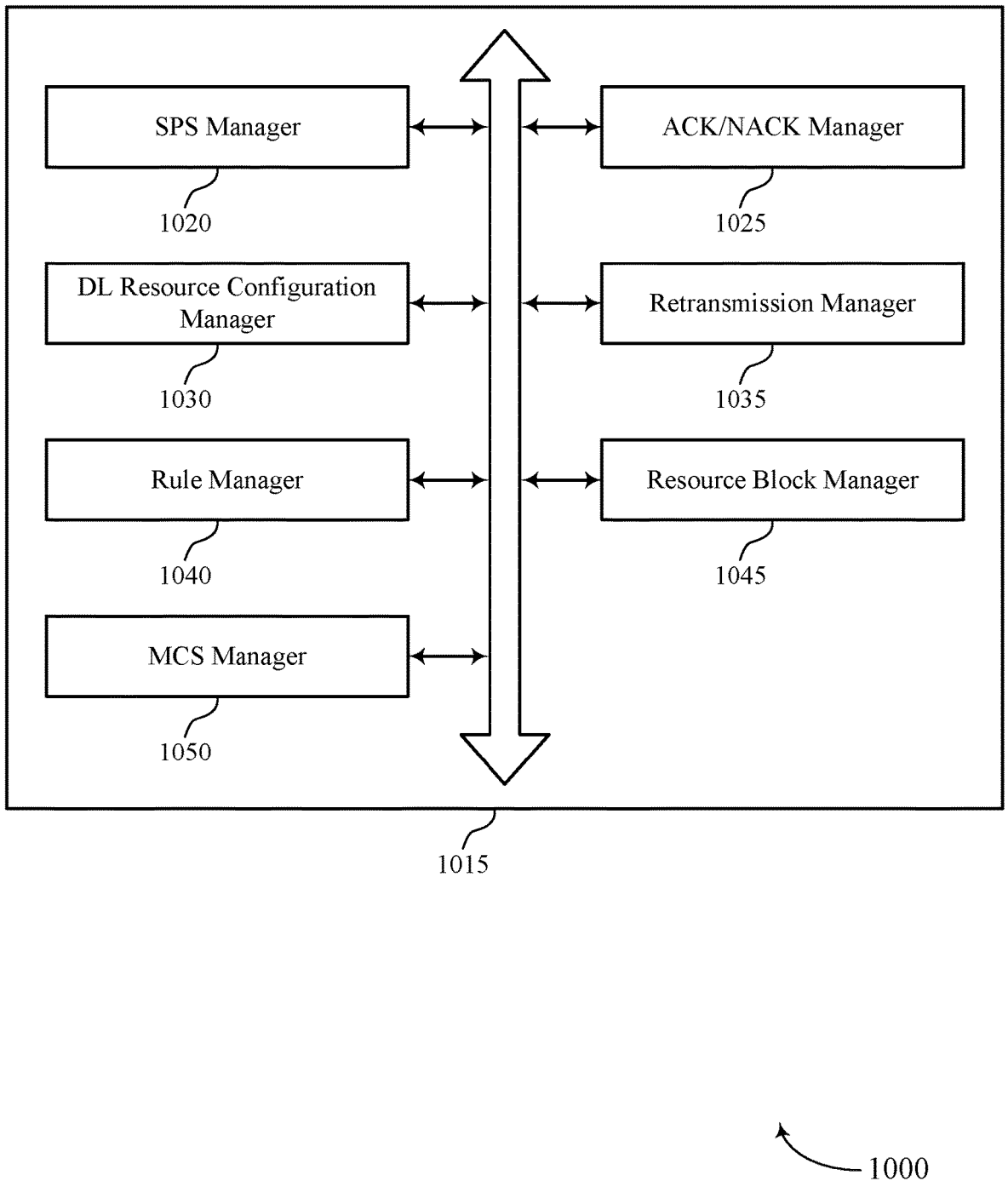

FIG. 10 shows a block diagram 1000 of a base station communications manager 1015 that supports group common control channel in URLLC in accordance with aspects of the present disclosure. The base station communications manager 1015 may be an example of aspects of a base station communications manager 815, a base station communications manager 915, or a base station communications manager 1115 described with reference to FIGS. 8, 9, and 11. The base station communications manager 1015 may include SPS manager 1020, ACK/NACK manager 1025, DL resource configuration manager 1030, retransmission manager 1035, rule manager 1040, resource block manager 1045, and MCS manager 1050. Each of these modules may communicate, directly or indirectly, with one another (e.g., via one or more buses).

SPS manager 1020 may transmit SPS messages to a set of UEs using respective resources corresponding to each UE. SPS manager 1020 may transmit a first uplink resource configuration to trigger uplink SPS messages from the set of UEs, receive the uplink SPS messages from the set of UEs, and determine that at least one uplink SPS message from at least one respective UE from the set of UEs was not received, transmit a second uplink resource configuration including information indicating an uplink resource configuration for retransmission of uplink SPS messages by the at least one respective UE, and receive the retransmission of uplink SPS messages from the at least one respective UE.

ACK/NACK manager 1025 may receive, from each of a subset of UEs from the set of UEs, a NACK message associated with the SPS messages.

DL resource configuration manager 1030 may transmit a group downlink control message including information associated with a downlink resource configuration for retransmission of the respective SPS messages to the subset of UEs. In some cases, the information associated with the downlink resource configuration includes a bitmap corresponding to which UEs in the set of UEs that NACK messages were received from and which UEs in the set of UEs that ACK messages were received from. In some cases, the group downlink control message includes a GC-PDCCH message.

Retransmission manager 1035 may retransmit SPS messages to each of the subset of UEs using the downlink resource configuration.

Rule manager 1040 may transmit, to the set of UEs, an indication of one or more rules to be applied to the information included in the group downlink control message in determining the downlink resource configuration to be used for retransmission of the SPS messages to the subset of UEs, transmit, to the set of UEs, an indication of a set of available downlink resource configurations to be applied to the information included in the group downlink control message in determining the downlink resource configuration to be used for retransmission of the SPS messages to the subset of UEs, and select from a preconfigured table a set of available downlink resource configurations to be applied to the information included in the group downlink control message in determining the downlink resource configuration to be used for retransmission of the SPS messages to the subset of UEs. In some cases, at least one rule includes evenly dividing a set of available resources between the UEs in the subset of UEs. In some cases, at least one rule includes dividing a set of available resources between the UEs in the subset of UEs based on a number of resource blocks that are associated with each UE in the subset of UEs.

Resource block manager 1045 may configure the group downlink control message to indicate a number of resource blocks that are associated with each UE in the subset of UEs.

MCS manager 1050 may transmit the SPS messages using a first MCS and retransmit the SPS messages using a second MCS that is different from the first MCS.

Figure 11:
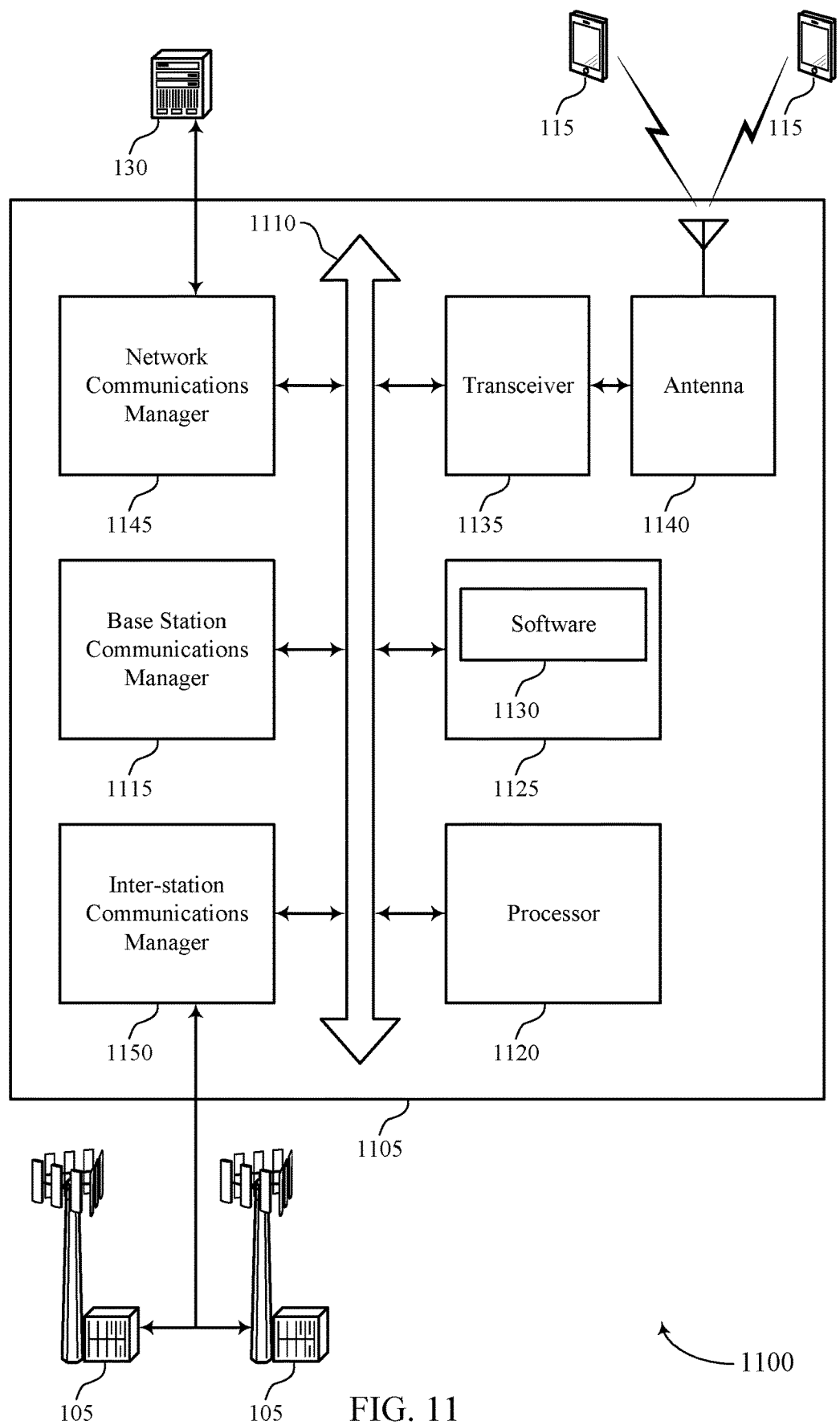
FIG. 11 illustrates a block diagram of a system including a base station that supports group common control channel in URLLC in accordance with aspects of the present disclosure.

FIG. 11 shows a diagram of a system 1100 including a device 1105 that supports group common control channel in URLLC in accordance with aspects of the present disclosure. Device 1105 may be an example of or include the components of wireless device 805, wireless device 905, or a base station 105 as described above, e.g., with reference to FIGS. 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting group common control channel in URLLC).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support group common control channel in URLLC. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
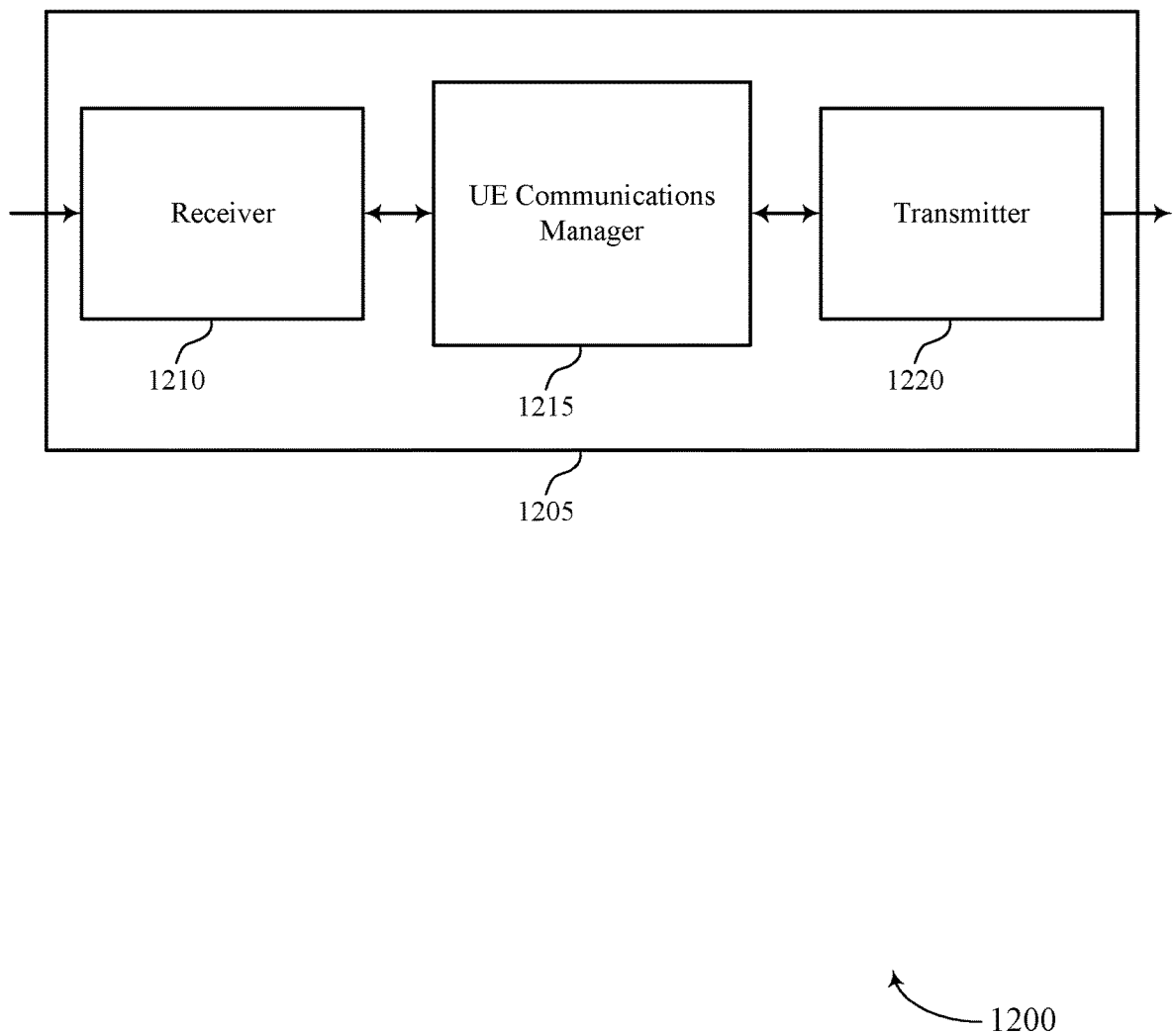
FIGS. 12 through 14 show block diagrams of a device that supports group common control channel in URLLC in accordance with aspects of the present disclosure.

FIG. 12 shows a block diagram 1200 of a wireless device 1205 that supports group common control channel in URLLC in accordance with aspects of the present disclosure. Wireless device 1205 may be an example of aspects of a UE 115 as described herein. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to group common control channel in URLLC, etc.). Information may be passed on to other components of the device. The receiver 1210 may be an example of aspects of the transceiver 1535 described with reference to FIG. 15. The receiver 1210 may utilize a single antenna or a set of antennas.

UE communications manager 1215 may be an example of aspects of the UE communications manager 1515 described with reference to FIG. 15.

UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may transmit a NACK message associated with a SPS message, receive, in response to the NACK message, a group downlink control message including information associated with a downlink resource configuration for retransmission of the SPS message to the UE, identify the downlink resource configuration based on the group downlink control message, and receive a retransmission of the SPS message using the downlink resource configuration.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
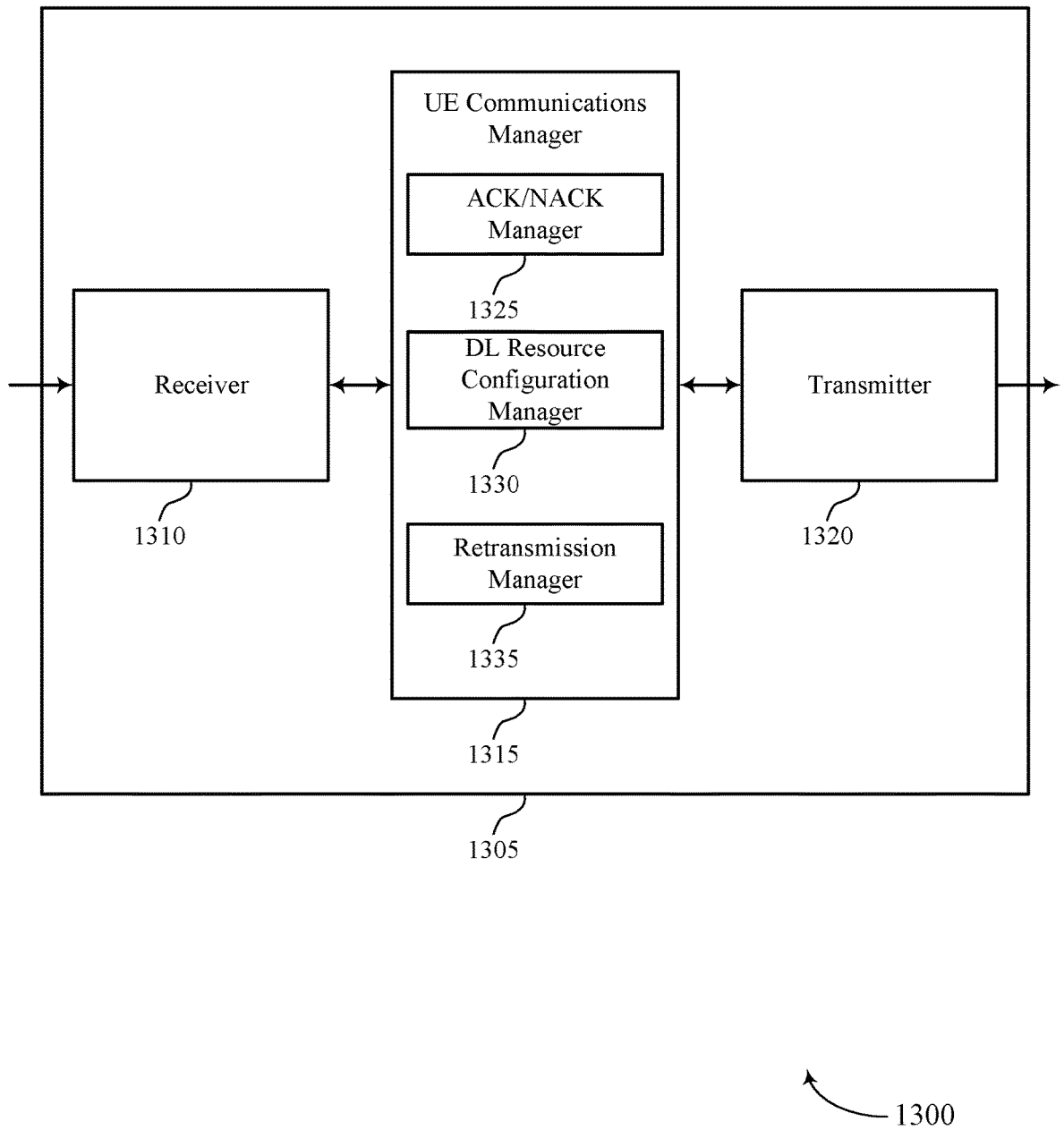

FIG. 13 shows a block diagram 1300 of a wireless device 1305 that supports group common control channel in URLLC in accordance with aspects of the present disclosure. Wireless device 1305 may be an example of aspects of a wireless device 1205 or a UE 115 as described with reference to FIG. 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to group common control channel in URLLC, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15.

UE communications manager 1315 may also include ACK/NACK manager 1325, DL resource configuration manager 1330, and retransmission manager 1335.

ACK/NACK manager 1325 may transmit a NACK message associated with a SPS message.

DL resource configuration manager 1330 may receive, in response to the NACK message, a group downlink control message including information associated with a downlink resource configuration for retransmission of the SPS message to the UE and identify the downlink resource configuration based on the group downlink control message.

Retransmission manager 1335 may receive a retransmission of the SPS message using the downlink resource configuration.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
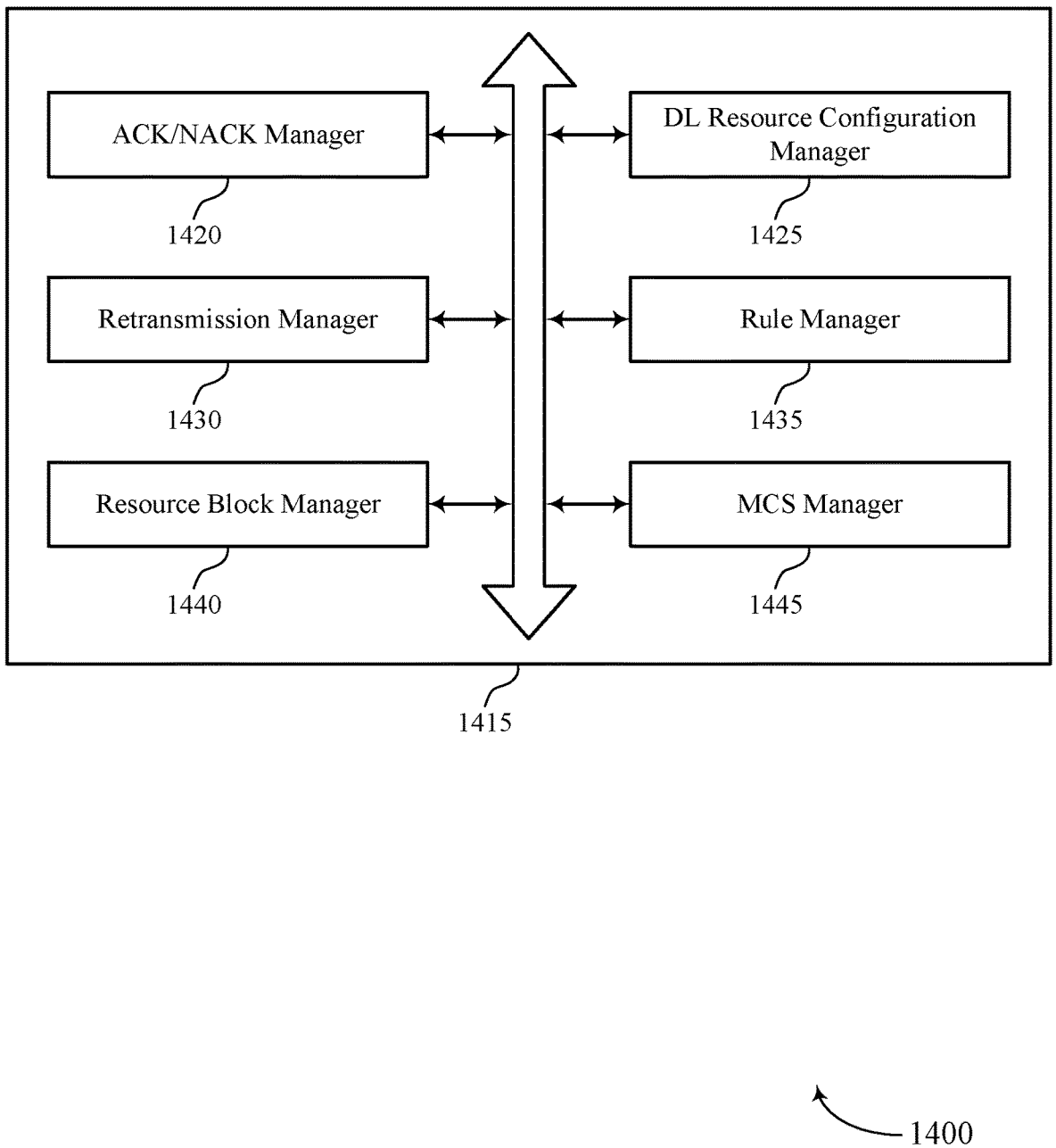

FIG. 14 shows a block diagram 1400 of a UE communications manager 1415 that supports group common control channel in URLLC in accordance with aspects of the present disclosure. The UE communications manager 1415 may be an example of aspects of a UE communications manager 1515 described with reference to FIGS. 12, 13, and 15. The UE communications manager 1415 may include ACK/NACK manager 1420, DL resource configuration manager 1425, retransmission manager 1430, rule manager 1435, resource block manager 1440, and MCS manager 1445. Each of these modules may communicate, directly or indirectly, with one another (e.g., via one or more buses).

ACK/NACK manager 1420 may transmit a NACK message associated with a SPS message.

DL resource configuration manager 1425 may receive, in response to the NACK message, a group downlink control message including information associated with a downlink resource configuration for retransmission of the SPS message to the UE and identify the downlink resource configuration based on the group downlink control message.

Retransmission manager 1430 may receive a retransmission of the SPS message using the downlink resource configuration.

Rule manager 1435 may receive an indication of one or more rules to be applied to the information included in the group downlink control message in identifying the downlink resource configuration to be used for retransmission of the SPS message, receive an indication of a set of available downlink resource configurations to be applied to the information included in the group downlink control message in identifying the downlink resource configuration to be used for retransmission of the SPS message, and select from a preconfigured table a set of available downlink resource configurations to be applied to the information included in the group downlink control message in identifying the downlink resource configuration to be used for retransmission of the SPS message. In some cases, at least one rule includes evenly dividing a set of available resources between one or more UEs in a subset of UEs transmitting NACK messages. In some cases, at least one rule includes dividing a set of available resources between one or more UEs in a subset of UEs transmitting NACK messages, the dividing based on a number of resource blocks that are associated with each UE in the subset of UEs.

Resource block manager 1440 may decode the group downlink control message to identify a number of resource blocks that are associated with the UE.

MCS manager 1445 may receive the SPS message using a first MCS and receive the retransmission the SPS message using a second MCS that is different from the first MCS.

Figure 15:
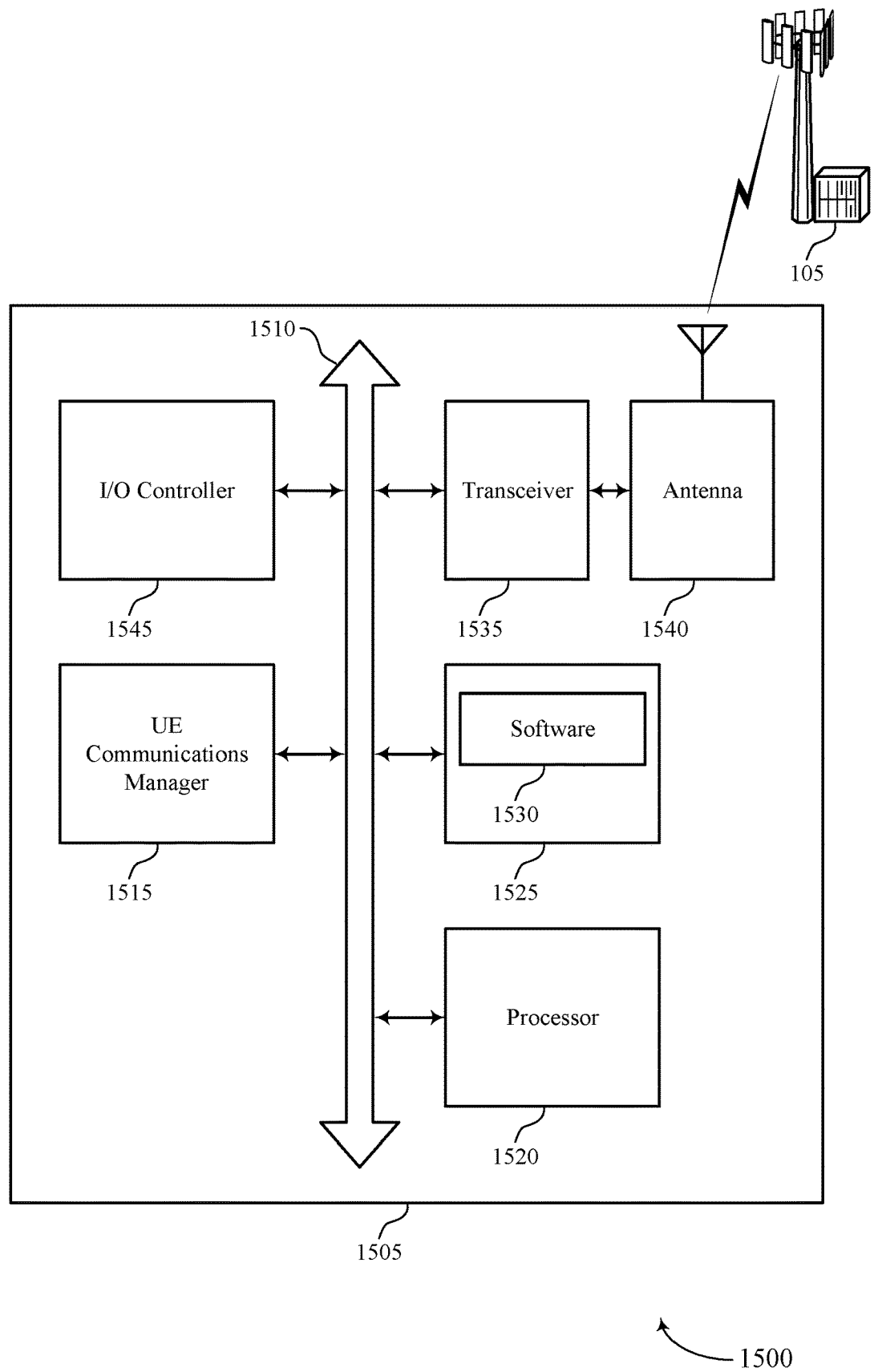
FIG. 15 illustrates a block diagram of a system including a user equipment (UE) that supports group common control channel in URLLC in accordance with aspects of the present disclosure.

FIG. 15 shows a diagram of a system 1500 including a device 1505 that supports group common control channel in URLLC in accordance with aspects of the present disclosure. Device 1505 may be an example of or include the components of UE 115 as described above, e.g., with reference to FIG. 1. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting group common control channel in URLLC).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support group common control channel in URLLC. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
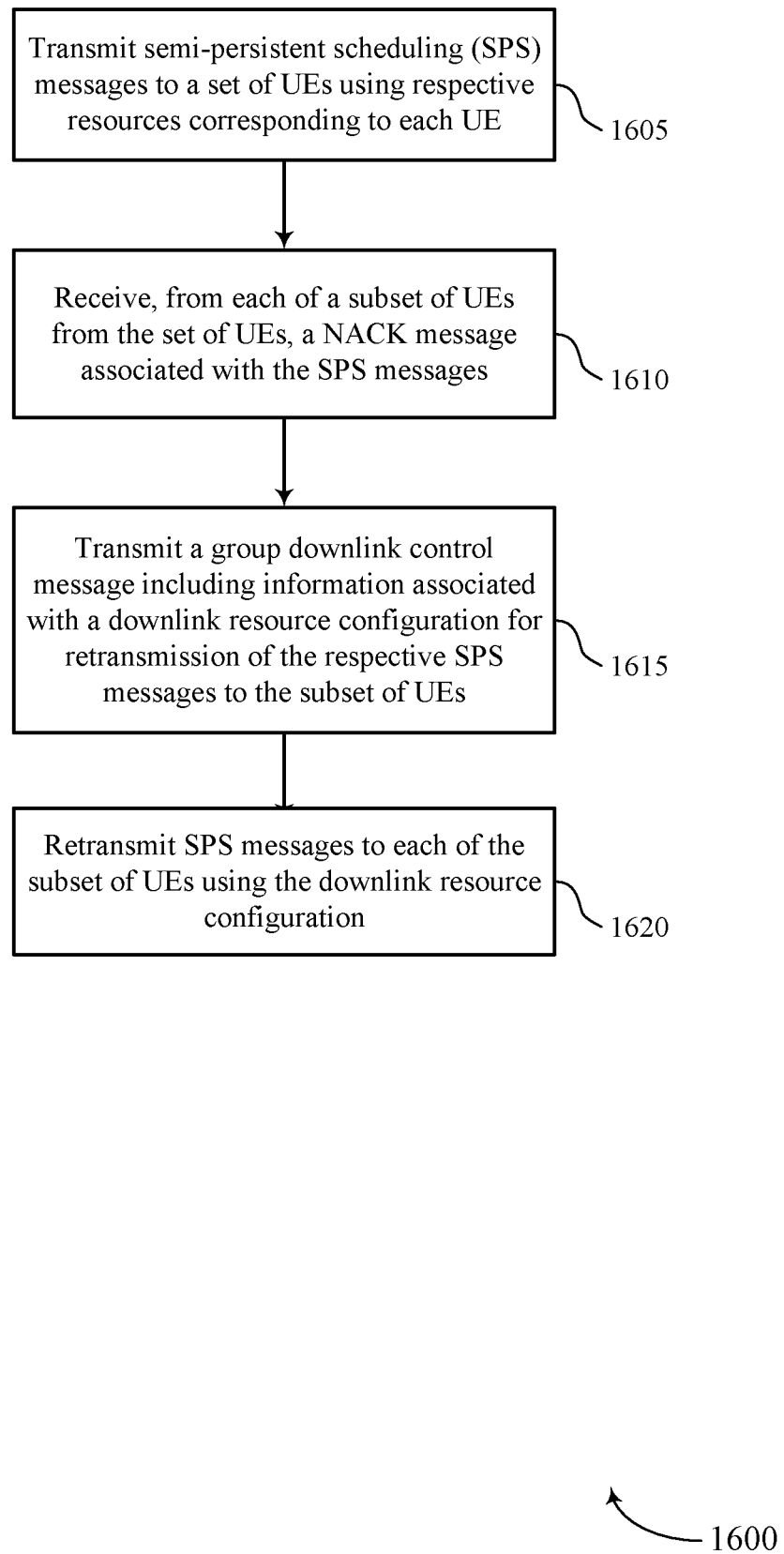
FIGS. 16 through 18 illustrate methods for group common control channel in URLLC in accordance with aspects of the present disclosure.

FIG. 16 shows a flowchart illustrating a method 1600 for group common control channel in URLLC in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit SPS messages to a set of UEs using respective resources corresponding to each UE. The operations of 1605 may be performed according to the methods described herein. In certain examples, aspects of the operations of 1605 may be performed by a SPS manager as described with reference to FIGS. 8 through 11.

At 1610 the base station 105 may receive, from each of a subset of UEs from the set of UEs, a NACK message associated with the SPS messages. The operations of 1610 may be performed according to the methods described herein. In certain examples, aspects of the operations of 1610 may be performed by a ACK/NACK manager as described with reference to FIGS. 8 through 11.

At 1615 the base station 105 may transmit a group downlink control message including information associated with a downlink resource configuration for retransmission of the respective SPS messages to the subset of UEs. The operations of 1615 may be performed according to the methods described herein. In certain examples, aspects of the operations of 1615 may be performed by a DL resource configuration manager as described with reference to FIGS. 8 through 11.

At 1620 the base station 105 may retransmit SPS messages to each of the subset of UEs using the downlink resource configuration. The operations of 1620 may be performed according to the methods described herein. In certain examples, aspects of the operations of 1620 may be performed by a retransmission manager as described with reference to FIGS. 8 through 11.

Aspects of method 1600 may provide for, instead of sending separate individual PDCCH to each UE (e.g., S/A) in the subset of UEs which transmitted NACK messages, a group PDCCH is sent (e.g., the group downlink control message). Otherwise, if a base station were to allocate new resources to retransmit SPS messages, it may be inefficient in a deployment scenario involving many UEs transmitting NACK messages. The group PDCCH may contain information from which each UE in the subset of UEs can derive its retransmission resource assignment uniquely. In some aspects, even the group PDCCH payload itself may be significantly reduced as compared to separate PDCCHs for each UE in the subset of UEs.

Figure 17:
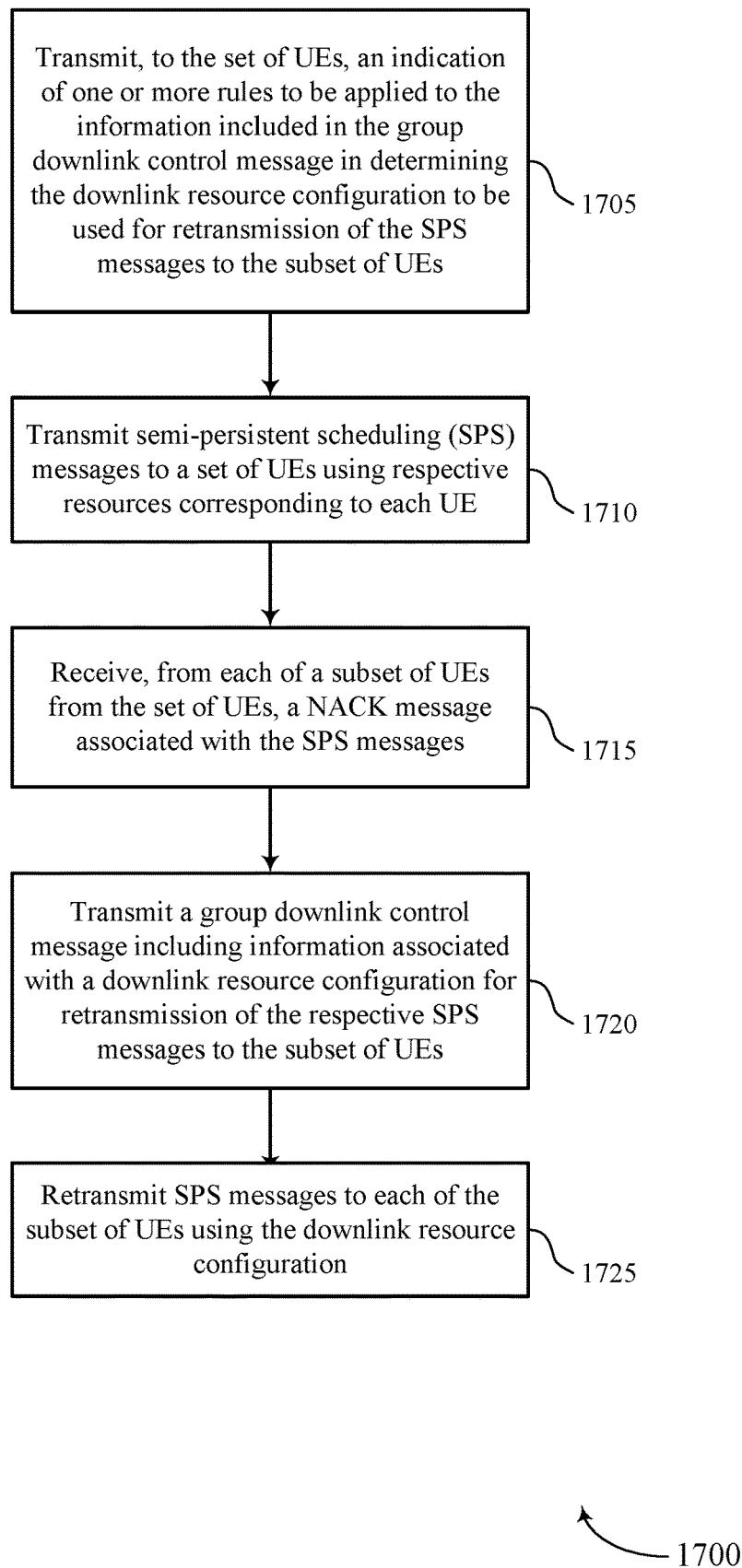

FIG. 17 shows a flowchart illustrating a method 1700 for group common control channel in URLLC in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit, to the set of UEs, an indication of one or more rules to be applied to the information included in the group downlink control message in determining the downlink resource configuration to be used for retransmission of the SPS messages to the subset of UEs. The operations of 1705 may be performed according to the methods described herein. In certain examples, aspects of the operations of 1705 may be performed by a rule manager as described with reference to FIGS. 8 through 11.

At 1710 the base station 105 may transmit SPS messages to a set of UEs using respective resources corresponding to each UE. The operations of 1710 may be performed according to the methods described herein. In certain examples, aspects of the operations of 1710 may be performed by a SPS manager as described with reference to FIGS. 8 through 11.

At 1715 the base station 105 may receive, from each of a subset of UEs from the set of UEs, a NACK message associated with the SPS messages. The operations of 1715 may be performed according to the methods described herein. In certain examples, aspects of the operations of 1715 may be performed by a ACK/NACK manager as described with reference to FIGS. 8 through 11.

At 1720 the base station 105 may transmit a group downlink control message including information associated with a downlink resource configuration for retransmission of the respective SPS messages to the subset of UEs. The operations of 1720 may be performed according to the methods described herein. In certain examples, aspects of the operations of 1720 may be performed by a DL resource configuration manager as described with reference to FIGS. 8 through 11.

At 1725 the base station 105 may retransmit SPS messages to each of the subset of UEs using the downlink resource configuration. The operations of 1725 may be performed according to the methods described herein. In certain examples, aspects of the operations of 1725 may be performed by a retransmission manager as described with reference to FIGS. 8 through 11.

Aspects of method 1700 may provide for, instead of sending separate individual PDCCH to each UE (e.g., S/A) in the subset of UEs which transmitted NACK messages, a group PDCCH is sent (e.g., the group downlink control message). Otherwise, if a base station were to allocate new resources to retransmit SPS messages, it may be inefficient in a deployment scenario involving many UEs transmitting NACK messages. The group PDCCH may contain information from which each UE in the subset of UEs can derive its retransmission resource assignment uniquely. In some aspects, even the group PDCCH payload itself may be significantly reduced as compared to separate PDCCHs for each UE in the subset of UEs.

Figure 18:
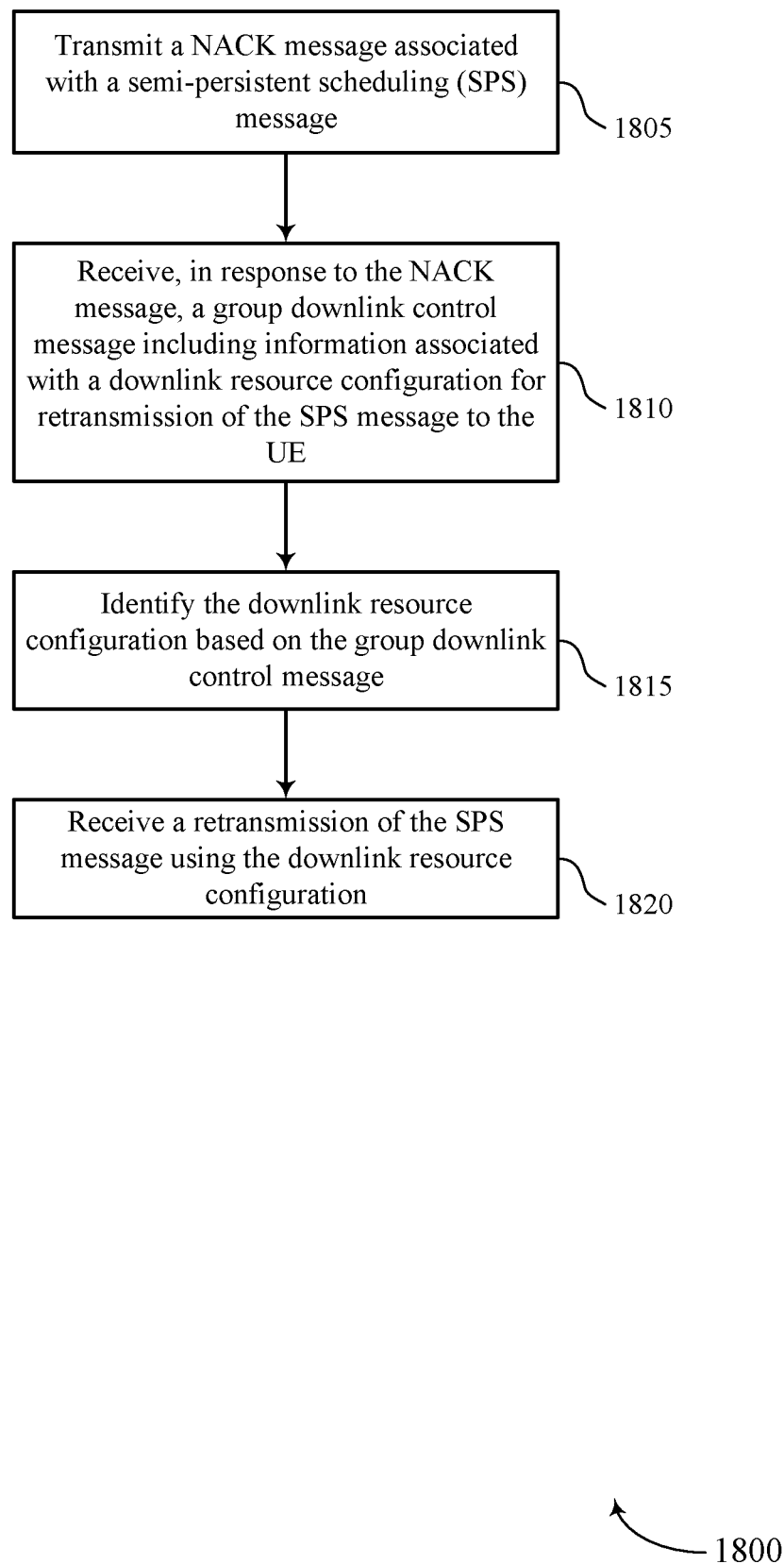

FIG. 18 shows a flowchart illustrating a method 1800 for group common control channel in URLLC in accordance with aspects of the present disclosure. The operations of method 1800 may be implemented by a UE 115 or its components as described herein. For example, the operations of method 1800 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may transmit a NACK message associated with a SPS message. The operations of 1805 may be performed according to the methods described herein. In certain examples, aspects of the operations of 1805 may be performed by a ACK/NACK manager as described with reference to FIGS. 12 through 15.

At 1810 the UE 115 may receive, in response to the NACK message, a group downlink control message including information associated with a downlink resource configuration for retransmission of the SPS message to the UE. The operations of 1810 may be performed according to the methods described herein. In certain examples, aspects of the operations of 1810 may be performed by a DL resource configuration manager as described with reference to FIGS. 12 through 15.

At 1815 the UE 115 may identify the downlink resource configuration based at least in part on the group downlink control message. The operations of 1815 may be performed according to the methods described herein. In certain examples, aspects of the operations of 1815 may be performed by a DL resource configuration manager as described with reference to FIGS. 12 through 15.

At 1820 the UE 115 may receive a retransmission of the SPS message using the downlink resource configuration. The operations of 1820 may be performed according to the methods described herein. In certain examples, aspects of the operations of 1820 may be performed by a retransmission manager as described with reference to FIGS. 12 through 15.

Aspects of method 1800 may provide for, instead of sending separate individual PDCCH to each UE (e.g., S/A) in the subset of UEs which transmitted NACK messages, a group PDCCH is sent (e.g., the group downlink control message). Otherwise, if a base station were to allocate new resources to retransmit SPS messages, it may be inefficient in a deployment scenario involving many UEs transmitting NACK messages. The group PDCCH may contain information from which each UE in the subset of UEs can derive its retransmission resource assignment uniquely. In some aspects, even the group PDCCH payload itself may be significantly reduced as compared to separate PDCCHs for each UE in the subset of UEs.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network entity, comprising:
   transmitting semi-persistent scheduling (SPS) messages to a set of user equipments (UEs) using respective resources corresponding to each UE;
   receiving, from each of a plurality of UEs from the set of UEs, a negative acknowledgement (NACK) message associated with the SPS messages;
   transmitting a group downlink control message, the group downlink control message including information associated with a downlink resource configuration for retransmission of the SPS messages from the network entity, wherein the downlink resource configuration indicates a plurality of resource assignments, wherein each resource assignment of the plurality of resource assignments corresponds to a respective identifier of a UE of a plurality of identifiers, and wherein each identifier of the plurality of identifiers corresponds to a respective UE of the plurality of UEs; and
   retransmitting, by the network entity, the SPS messages to the plurality of UEs using the downlink resource configuration.

2. The method of claim 1, further comprising:
   transmitting, to the set of UEs, an indication of one or more rules to be applied to the information included in the group downlink control message in determining the downlink resource configuration to be used for the retransmission of the SPS messages from the network entity to the plurality of UEs.

3. The method of claim 2, wherein at least one rule includes evenly dividing a set of available resources between the UEs in the plurality of UEs.

4. The method of claim 2, wherein at least one rule includes dividing a set of available resources between the UEs in the plurality of UEs based at least in part on a number of resource blocks that are associated with each UE in the plurality of UEs.

5. The method of claim 2, further comprising:
   transmitting, to the set of UEs, an indication of a set of available downlink resource configurations to be applied to the information included in the group downlink control message in determining the downlink resource configuration to be used for the retransmission of the SPS messages from the network entity to the plurality of UEs.

6. The method of claim 2, further comprising:
   selecting from a preconfigured table a set of available downlink resource configurations to be applied to the information included in the group downlink control message in determining the downlink resource configuration to be used for the retransmission of the SPS messages from the network entity to the plurality of UEs.

7. The method of claim 1, further comprising:
   configuring the group downlink control message to indicate a number of resource blocks that are associated with each UE in the plurality of UEs.

8. The method of claim 1, wherein the information associated with the downlink resource configuration comprises a bitmap corresponding to which UEs in the set of UEs that NACK messages were received from and which UEs in the set of UEs that acknowledgement (ACK) messages were received from.

9. The method of claim 1, further comprising:
   transmitting the SPS messages using a first modulation and coding scheme (MCS); and
   retransmitting the SPS messages using a second MCS that is different from the first MCS.

10. The method of claim 1, further comprising:
    transmitting a first uplink resource configuration to trigger uplink SPS messages from the set of UEs;
    receiving the uplink SPS messages from the set of UEs;
    determining that at least one uplink SPS message from at least one respective UE from the set of UEs was not received;
    transmitting a second uplink resource configuration including information indicating an uplink resource configuration for retransmission of the uplink SPS messages by the at least one respective UE; and
    receiving the retransmission of the uplink SPS messages from the at least one respective UE.

11. The method of claim 1, wherein the group downlink control message includes a group common physical downlink control channel (GC-PDCCH) message.

12. A method for wireless communication at a user equipment (UE), comprising:
    transmitting, to a network entity, a negative acknowledgement (NACK) message associated with a semi-persistent scheduling (SPS) message;
    receiving, in response to the NACK message, a group downlink control message, the group downlink control message including information associated with a downlink resource configuration for retransmission of the SPS message from the network entity, wherein the downlink resource configuration indicates a plurality of resource assignments, wherein each resource assignment of the plurality of resource assignments corresponds to a respective identifier of a UE of a plurality of identifiers, and wherein each identifier of the plurality of identifiers corresponds to a respective UE of a plurality of UEs that transmitted a NACK message associated with the SPS message, including the UE;
    identifying the downlink resource configuration based at least in part on the group downlink control message; and
    receiving, from the network entity, the retransmission of the SPS message using the downlink resource configuration.

13. The method of claim 12, further comprising:
    receiving an indication of one or more rules to be applied to the information included in the group downlink control message in identifying the downlink resource configuration to be used for the retransmission of the SPS message from the network entity.

14. The method of claim 13, wherein at least one rule includes evenly dividing a set of available resources between one or more UEs in the plurality of UEs transmitting NACK messages.

15. The method of claim 13, wherein at least one rule includes dividing a set of available resources between one or more UEs in the plurality of UEs transmitting NACK messages, the dividing based at least in part on a number of resource blocks that are associated with each UE in the plurality of UEs.

16. The method of claim 13, further comprising:
receiving an indication of a set of available downlink resource configurations to be applied to the information included in the group downlink control message in identifying the downlink resource configuration to be used for the retransmission of the SPS message from the network entity.

17. The method of claim 13, further comprising:
selecting from a preconfigured table a set of available downlink resource configurations to be applied to the information included in the group downlink control message in identifying the downlink resource configuration to be used for the retransmission of the SPS message from the network entity.

18. The method of claim 12, further comprising:
decoding the group downlink control message to identify a number of resource blocks that are associated with the UE.

19. The method of claim 12, further comprising:
receiving the SPS message using a first modulation and coding scheme (MCS); and
receiving the retransmission of the SPS message using a second MCS that is different from the first MCS.

20. A network entity for wireless communication, comprising:
a processor;
memory in electronic communication with the processor; and
instructions stored in the memory and executable by the processor to cause the network entity to:
transmit semi-persistent scheduling (SPS) messages to a set of user equipments (UEs) using respective resources corresponding to each UE;
receive, from each of a plurality of UEs from the set of UEs, a negative acknowledgement (NACK) message associated with the SPS messages;
transmit a group downlink control message, the group downlink control message including information associated with a downlink resource configuration for retransmission of the SPS messages from the network entity, wherein the downlink resource configuration indicates a plurality of resource assignments, wherein each resource assignment of the plurality of resource assignments corresponds to a respective identifier of a UE of a plurality of identifiers, and wherein each identifier of the plurality of identifiers corresponds to a respective UE of the plurality of UEs; and
retransmit, by the network entity, the SPS messages to each of the plurality of UEs using the downlink resource configuration.

21. The network entity of claim 20, wherein the instructions are further executable by the processor to cause the network entity to:
transmit, to the set of UEs, an indication of one or more rules to be applied to the information included in the group downlink control message in determining the downlink resource configuration to be used for the retransmission of the SPS messages from the network entity to the plurality of UEs.

22. The network entity of claim 21, wherein the instructions are further executable by the processor to cause the network entity to:
at least one rule includes evenly dividing a set of available resources between the UEs in the plurality of UEs.

23. The network entity of claim 21, wherein the instructions are further executable by the processor to cause the network entity to:
at least one rule includes dividing a set of available resources between the UEs in the plurality of UEs based at least in part on a number of resource blocks that are associated with each UE in the plurality of UEs.

24. The network entity of claim 21, wherein the instructions are further executable by the processor to cause the network entity to:
transmit, to the set of UEs, an indication of a set of available downlink resource configurations to be applied to the information included in the group downlink control message in determining the downlink resource configuration to be used for the retransmission of the SPS messages from the network entity to the plurality of UEs.

25. The network entity of claim 21, wherein the instructions are further executable by the processor to cause the network entity to:
select from a preconfigured table a set of available downlink resource configurations to be applied to the information included in the group downlink control message in determining the downlink resource configuration to be used for the retransmission of the SPS messages from the network entity to the plurality of UEs.

26. A user equipment (UE) for wireless communication, comprising:
a processor;
memory in electronic communication with the processor; and
instructions stored in the memory and executable by the processor to cause the UE to:
transmit, to a network entity, a negative acknowledgement (NACK) message associated with a semi-persistent scheduling (SPS) message;
receive, in response to the NACK message, a group downlink control message, the group downlink control message including information associated with a downlink resource configuration for retransmission of the SPS message from the network entity, wherein the downlink resource configuration indicates a plurality of resource assignments, wherein each resource assignment of the plurality of resource assignments corresponds to a respective identifier of a UE of a plurality of identifiers, and wherein each identifier of the plurality of identifiers corresponds to a respective UE of a plurality of UEs that transmitted a NACK message associated with the SPS message, including the UE;
identify the downlink resource configuration based at least in part on the group downlink control message; and
receive, from the network entity, the retransmission of the SPS message using the downlink resource configuration.

27. The UE of claim 26, wherein the instructions are further executable by the processor to cause the UE to:
receive an indication of one or more rules to be applied to the information included in the group downlink control message in identifying the downlink resource configuration to be used for the retransmission of the SPS message from the network entity.

28. The UE of claim 27, wherein the instructions are further executable by the processor to cause the UE to:

at least one rule includes evenly dividing a set of available resources between one or more UEs in the plurality of UEs transmitting NACK messages.

29. The UE of claim 27, wherein the instructions are further executable by the processor to cause the UE to:
at least one rule includes dividing a set of available resources between one or more UEs in the plurality of UEs transmitting NACK messages, the dividing based at least in part on a number of resource blocks that are associated with each UE in the plurality of UEs.

30. The UE of claim 27, wherein the instructions are further executable by the processor to cause the UE to:
select from a preconfigured table a set of available downlink resource configurations to be applied to the information included in the group downlink control message in identifying the downlink resource configuration to be used for the retransmission of the SPS message from the network entity.

* * * * *